(12) United States Patent
Ishii et al.

(10) Patent No.: US 7,075,277 B2
(45) Date of Patent: Jul. 11, 2006

(54) DC-DC CONVERTER

(75) Inventors: Takuya Ishii, Suita (JP); Hiroshi Saito, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 421 days.

(21) Appl. No.: 10/468,704

(22) PCT Filed: Dec. 12, 2002

(86) PCT No.: PCT/JP02/13044

§ 371 (c)(1),
(2), (4) Date: Aug. 21, 2003

(87) PCT Pub. No.: WO03/052909

PCT Pub. Date: Jun. 26, 2003

(65) Prior Publication Data

US 2004/0090215 A1    May 13, 2004

(30) Foreign Application Priority Data

Dec. 17, 2001 (JP) .............................. 2001-383407
Feb. 19, 2002 (JP) .............................. 2002-041693

(51) Int. Cl.
*G05F 1/24* (2006.01)

(52) U.S. Cl. ...................... 323/259; 323/222; 323/225; 323/284

(58) Field of Classification Search ........ 323/222–225, 323/259, 268, 271, 282, 284, 285, 266
See application file for complete search history.

(56) References Cited

U.S. PATENT DOCUMENTS

| 4,395,675 | A | 7/1983 | Toumani |
| 6,037,755 | A | 3/2000 | Mao et al. |
| 6,166,527 | A | 12/2000 | Dwelley et al. |
| 6,348,781 | B1 * | 2/2002 | Midya et al. ............... 323/224 |
| 6,946,820 | B1 * | 9/2005 | Ishii et al. .................. 323/222 |

FOREIGN PATENT DOCUMENTS

| JP | 55068877 A | 5/1980 |
| JP | 2000-166223 A | 6/2000 |

* cited by examiner

*Primary Examiner*—Gary L Laxton
(74) *Attorney, Agent, or Firm*—Akin Gump Strauss Hauer & Feld, LLP

(57) ABSTRACT

A DC—DC converter that receives input of a direct current voltage such as a battery and supplies a controlled direct current voltage to a load is simplified. It comprises a voltage step-down converter section consisting of a first switch 2, a first rectifying means 3 and an inductor 4, a voltage step-up converter section consisting of an inductor 4, a second switch 5 and a second rectifying means 6, and a control section consisting of an output capacitor 7, an error amplifying circuit 10, an oscillation circuit 11 and a pulse width control circuit 12. An oscillation voltage Vt from the oscillation circuit 11 is compared with an error voltage Ve from the error amplifying circuit 10 and a duty ratio of each switch is adjusted to control the operation of voltage step-down, voltage step-up and step-down, and voltage step-up.

16 Claims, 11 Drawing Sheets

(a)

(b)

(c)

(a)

(b)

(a)

(b)

DC-DC CONVERTER

CROSS-REFERENCE TO RELATED APPLICATION

This application is a Section 371 of International Application No. PCT/JP02/13044, filed Dec. 12, 2002, the disclosure of which is incorporated herein by reference.

TECHNICAL FIELD

The present invention relates to a DC—DC converter which is used for various electronic apparatuses, receives a direct current voltage input from a battery or the like and supplies a controlled direct current voltage to a load, and more particularly relates to a DC—DC converter capable of carrying out voltage step-up and step-down in an input and output noninverting state.

BACKGROUND ART

FIG. 10(a) and FIG. 10(b) show a prior art of a DC—DC converter for stepping up or stepping down a direct current voltage input from a direct current power source such as a battery in an input and output noninverting state (the state wherein the polarity of the direct current input voltage is the same as that of the direct current output voltage) and supplying the direct current voltage to a load (See Japanese Patent No. Sho 58-40913). Voltage step-up is to output a direct current output voltage higher than a direct current input voltage, and voltage step-down is the reverse thereto. FIG. 10(a) is a circuit diagram of the above-mentioned DC—DC converter disclosed as the prior art, and FIG. 10(b) is a waveform diagram showing signals at each section thereof during the operation.

As shown in FIG. 10(a), this DC—DC converter is connected to a direct current input power source 31 for a voltage Ei and provided with a voltage step-down converter section consisting of a first switch 32, a first diode 33 and an inductor 34, a step-up converter section consisting of a second switch 35 and a second diode 36, having the inductor 34 in common, and an output capacitor 37. A voltage Eo of the output capacitor 37 is applied to a load 38 as a direct current output voltage.

As shown in FIG. 10(b), the first switch 32 and the second switch 35 are turned ON and OFF in the same switching cycle-T. The ratios of ON time of the first switch 32 and the second switch 35 per one switching cycle are referred to as a duty ratio δ 1 and a duty ratio δ2, respectively. As shown in the figure, the duty ratio δ1 is made larger than the duty ratio δ2: (δ1>δ).

When both the first switch 32 and the second switch 35 remain ON, the voltage Ei of the direct current input power source 31 is applied to the inductor 34. The time of application is the product of the duty ratio 2 by the switching cycle T: (δ2·T). At this time, a current flows from the direct current input power source 31 to the inductor 34, whereby magnetic energy is stored. Next, when the second switch 35 turns OFF, the second diode 36 becomes conductive, and the voltage that is a difference between the direct current input voltage Ei and the direct current output voltage Eo: (Ei−Eo) is applied to the inductor 34. The time of application is a difference between the product of the duty ratio δ1 by the switching cycle T, and the product of the duty ratio δ2 by the switching cycle T: (δ1·T−δ2·T). During the time of application, a current flows from the DC input power source 31 to the output capacitor 37 via the inductor 34. Further, when the first switch 32 turns OFF, the first diode 33 becomes conductive, and the direct current output voltage Eo is applied to the inductor 34 in the opposite direction. This time of application is a time (T−δ1·T), and a current flows from the inductor 34 to the output capacitor 37, whereby the stored magnetic energy is released.

As mentioned above, by repeating the operation of storage and release of the magnetic energy, electric power is supplied from the output capacitor 37 to the load 38. In a stable operation state wherein the storage and release of the magnetic energy of the inductor 34 balances, the sum of the products of the applied voltages and times of application is zero as represented by equation (1).

$$Ei \cdot \delta 2 \cdot T + (Ei-Eo)(\delta 1 \cdot T - \delta 2 \cdot T) - Eo(T - \delta 1 \cdot T) = 0 \qquad (1)$$

By arranging this equation, a conversion characteristic equation represented by equation (2) is obtained.

$$Eo/Ei = \delta 1/(1-\delta 2) \qquad (2)$$

When the duty ratio δ2 is 0: (δ2=0), the ratio Eo/Ei of the direct current output voltage Eo to the direct current input voltage Ei becomes δ1: (Eo/Ei=δ1) and the converter operates as a voltage step-down converter. Further, when the duty ratio δ1 is 1: (δ1=1), the ratio Eo/Ei becomes 1/(1−δ2): (Eo/Ei=1/(1−δ2), and the converter operates as a voltage step-up converter. By controlling the duty ratios of the first and second switches 32, 35 respectively, the ratio of input and output voltages δ1/(1−δ2) can be set at 0 to infinity. In other words, the DC—DC converter operates as a voltage step-up and step-down converter theoretically capable of obtaining arbitrary direct current output voltage Eo from arbitrary direct current input voltage Ei.

The above-mentioned control of DC—DC converter can be carried out with, for example, a DC—DC converter having a control circuit 50 shown in FIG. 11(a) (See U.S. Pat. No. 4,395,675). For convenience of description, the circuit diagram shown in FIG. 11(a) is rewritten by applying the circuit described in FIG. 9 of the U.S. Pat. No. 4,395,675 to the DC—DC converter with the configuration as shown in FIG. 10(a). FIG. 11(b) shows operation waveforms of each section thereof. Operation of the DC—DC converter shown in FIG. 11(a) will be described below with reference to FIG. 11(b).

In FIG. 11(a), a reference voltage Vr is output from a reference voltage source 40 of the control circuit 50 and applied to an error amplifier 41. The error amplifier 41 compares the direct current output voltage Eo with the reference voltage Vr and outputs a first error voltage Ve1. An oscillation circuit 42 outputs an oscillation voltage Vt that oscillates at a predetermined cycle. An offset circuit 44 receives the first error voltage Ve1 as an input and adds a predetermined offset voltage to the first error voltage Ve1 to output a second error voltage Ve2.

FIG. 11(b) shows waveforms of the oscillation voltage Vt, two error voltages Ve1 and Ve2, and two driving signals Vg32 and Vg 35. A first comparator 43 compares the first error voltage Ve1 with the oscillation voltage Vt, and outputs the driving signal Vg 35 that becomes "H" during a period when the first error voltage Ve1 is larger than the oscillation voltage Vt: (Ve1>Vt) ("H" indicates "high" of logical level). It is assumed that when the driving signal Vg35 is "H", the second switch 35 turns to ON state, and when it is "L", the switch turns to OFF state ("L" indicates "low" of logical level). A second comparator 45 compares the second error voltage Ve2 with the oscillation voltage Vt, and outputs the driving signal Vg 32 that becomes "H" during a period when the second error voltage Ve2 is larger than the oscillation voltage Vt: (Ve2>Vt). It is assumed that when the driving signal Vg32 is "H", the first switch 32 turns to ON state, and when it is "L", the switch turns to OFF state.

In the case where the direct current input voltage Ei is sufficiently higher than the direct current output voltage Eo as a control target, the first error voltage Ve1 and the second error voltage Ve2 become lower in a stable state of the direct current output voltage Eo. During the period shown by A in FIG. 11(b), when the first error voltage Ve1 is lower than the oscillation voltage Vt at all times, the driving signal Vg35 becomes "L" at all times and the second switch 35 turns to OFF state at all times. On the other hand, the driving signal Vg32 that is set based on the comparison between the second error voltage Ve2 and the oscillation voltage Vt drives the first switch 32 to be turned ON and OFF. In other words, operation is made as a voltage step-down converter during the period A in FIG. 11(b).

In the case where the direct current input voltage Ei has a voltage in the vicinity of the direct current output voltage Eo as a control target, as in the period shown by B in FIG. 11(b), the waveforms of both the first error voltage Ve1 and the second error voltage Ve2 intersect the waveform of the oscillation voltage Vt. Therefore, the first switch 32 is driven to be turned ON and OFF by the driving signal Vg32, and the second switch is driven to be turned ON and OFF by the driving signal Vg35. In other words, the operation is made as a voltage step-up and step-down converter during the period B in FIG. 11(b).

Furthermore, in the case where the direct current input voltage Ei is lower than the direct current output voltage Eo as a control target, when the second error voltage Ve2 becomes higher than the oscillation voltage Vt at all times as in the period shown by C in FIG. 11(b), the driving signal Vg32 becomes "H" at all times and the first switch 32 turns to ON state at all times. On the other hand, the driving signal Vg35 that is set based on the comparison between the first error voltage Ve1 and the oscillation voltage Vt drives the second switch 35 to turn ON and OFF. In other words, the operation is made as a voltage step-up converter during the period C in FIG. 11(b).

The ON and OFF timing of the first switch 32 and the second switch 35 shown in FIG. 11(b) is different from the ON and OFF timing of the first switch 32 and the second switch 35 shown in FIG. 10(b). This difference depends on the difference between control circuits shown in FIG. 10 and FIG. 11 in constitution and function. Combinations of ON and OFF of the first switch 32 and the second switch 35 in the DC—DC converter are basically the following three types: both the first switch 32 and the second switch 35 are in ON state; the first switch 32 is in ON state and the second switch 35 is in OFF state; and both the first switch 32 and the second switch 35 are in OFF state. In the case where the first switch 32 is in the OFF state and the second switch is in the ON state, the inductor 34 is short-circuited, and having no relation with transmission of electric power between input and output, and therefore the state of operation should be avoided. On the condition that any combination of the above-mentioned three types of operation states never causes a current flowing to the inductor 34 to become zero, when the ratio of the ON time of the first switch 32 per one switching cycle is referred as to δ1 and the ratio of the ON time of the second switch 35 per one switching cycle is referred as to δ2, the relation of the following equation (3) is established between input and output voltages. This also applies to the timing of the ON and OFF operation of each switch shown by waveforms in FIG. 10(b) as well as the timing of ON and OFF of each switch shown by waveforms in FIG. 11(b).

$$Eo/Ei = \delta1/(1-\delta2) \quad (3)$$

Other examples of method for controlling a DC—DC converter capable of carrying out voltage step-up and step-down are disclosed in U.S. Pat. No. 5,402,060 and U.S. Pat. No. 6,166,527. Both of these compare the oscillation voltage with the error voltage and add or subtract an offset voltage to or from the oscillation voltage or the error voltage so that a driving signal for driving the first switch and a driving signal for driving the second switch are formed.

The DC—DC converter of the above-mentioned U.S. Pat. No. 4,395,675 requires a plurality of error voltages Ve1 and Ve2, thereby to cause the problem of complicating the control circuit.

Further, during voltage step-up and step-down operation in which both the first switch 32 and the second switch 35 is turned ON and OFF, there causes the problem of increasing switching loss compared with during voltage step-down operation or voltage step-up operation. In order to narrow the region where the voltage step-up and step-down operation is carried out to solve the problem, it is necessary that the offset voltage to be added to the error voltage is made to a voltage in the vicinity of an amplitude of the oscillation voltage. However, when the offset voltage is made to the voltage in the vicinity of the amplitude of the oscillation voltage, fluctuation band of the error voltage becomes larger in order to ensure control range in step-down voltage operation and step-up voltage operation. For that reason, in the case of low power supply voltage of the control circuit, there has caused a problem of difficulties in design.

DISCLOSURE OF INVENTION

An object of the present invention is to provide a high efficiency DC—DC converter that solves the above-mentioned problems, enables controlling the step-up operation, the step-up and step-down operation and the step-down operation with a simple configuration and reduces the loss.

In order to achieve the above-mentioned object, the DC—DC converter according to the present invention is a voltage step-up and step-down converter comprising a step-down converter section having a first switch, a voltage step-up converter section having a second switch and a control section for turning ON and OFF the above-mentioned first switch and the above-mentioned second switch, respectively, for receiving a direct current input voltage and outputting a direct current output voltage to a load.

The above-mentioned control section has an error amplifying circuit for comparing the above-mentioned direct current output voltage with a predetermined voltage and outputting an error voltage, an oscillation circuit and a pulse width control circuit.

The above-mentioned oscillation circuit generates an oscillation voltage which is an oscillation voltage cyclically changing between a first setting voltage and a second setting voltage lower than the above-mentioned first setting voltage, the ratio of rising time or the ratio of lowering time per one cycle of the above-mentioned oscillation voltage increases corresponding to the increase of the difference between the above-mentioned error voltage and the above-mentioned first setting voltage, when the above-mentioned error voltage is higher than the above-mentioned first setting voltage, and generates an oscillation voltage in which the ratio of rising time or the ratio of lowering time per one cycle of the above-mentioned oscillation voltage increases corresponding to the increase of the difference between the above-mentioned error voltage and the above-mentioned second setting voltage, when the above-mentioned error voltage is lower than the above-mentioned second setting voltage.

In the case where the above-mentioned error voltage is compared with the above-mentioned oscillation voltage and the above-mentioned error voltage does not coincide with the above-mentioned oscillation voltage, the above-mentioned pulse width control circuit carries out control in a voltage step-down operation mode wherein the above-mentioned second switch is fixed at OFF state and the above-mentioned first switch is turned ON or OFF, or carries out control in a voltage step-up operation mode wherein the above-mentioned first switch is fixed at ON state and the above-mentioned second switch is turned ON or OFF.

In the case where the above-mentioned error voltage coincides with the above-mentioned oscillation voltage occasionally, the above-mentioned pulse width control circuit further controls the ON and OFF time of the above-mentioned first switch and the ON and OFF time of the above-mentioned second switch so as to carry out control in the voltage step-up and step-down operation mode wherein both the above-mentioned first switch and the above-mentioned second switch are turned ON and OFF.

In the DC—DC converter of the present invention, the above-mentioned error amplifying circuit is configured so as to output the error voltage that rises as the above-mentioned direct current output voltage is lower than the above-mentioned predetermined voltage and lowers as the above-mentioned direct current output voltage is higher than the above-mentioned predetermined voltage.

The above-mentioned oscillation circuit is configured so as to increase the ratio of rising time per one cycle of the above-mentioned oscillation voltage as the difference between the above-mentioned error voltage and the above-mentioned second setting voltage increases when the above-mentioned error voltage is lower than the above-mentioned second setting voltage, and to increase the ratio of rising time per one cycle of the above-mentioned oscillation voltage as the difference between the above-mentioned error voltage and the above-mentioned first setting voltage increases when the above-mentioned error voltage is higher than the above-mentioned first setting voltage.

The above-mentioned pulse width control circuit carries out control in the voltage step-down operation mode wherein the above-mentioned second switch is fixed at OFF state, and the above-mentioned first switch is turned to OFF state in the rising period of the above-mentioned oscillation voltage and turned to ON state in the remaining period in the case where the above-mentioned error voltage is lower than the above-mentioned second setting voltage. The above-mentioned pulse width control circuit carries out control in the voltage step-up operation mode wherein the above-mentioned first switch is fixed at ON state, and the above-mentioned second switch is turned to ON state in the rising period of the above-mentioned oscillation voltage and turned to OFF state in the remaining period in the case where the above-mentioned error voltage is higher than the above-mentioned first setting voltage. In the case where the above-mentioned error voltage coincides with the above-mentioned oscillation voltage occasionally, the above-mentioned pulse width control circuit further carries out control in the voltage step-up and step-down operation mode wherein the above-mentioned first switch is turned to OFF state in the period during which the above-mentioned error voltage is lower than the above-mentioned oscillation voltage in the rising period of the above-mentioned oscillation voltage and is turned to ON state in the remaining period, and the above-mentioned second switch is turned to ON state in the period during which the above-mentioned error voltage is higher than the above-mentioned oscillation voltage in the rising period of the above-mentioned oscillation voltage and is turned to OFF state in the remaining period.

In the DC—DC converter of the present invention, said oscillation circuit has an oscillation capacitor for outputting said oscillation voltage by being charged or discharged in response to a pulse signal having a predetermined cycle.

The above-mentioned oscillation circuit may be configured so as to charge the above-mentioned oscillation capacitor when said pulse signal is input in a state wherein the above-mentioned oscillation voltage is maintained at the above-mentioned second setting voltage, to discharge the above-mentioned oscillation capacitor when the above-mentioned oscillation voltage reaches the first setting voltage, and to maintain the above-mentioned oscillation voltage in the vicinity of the above-mentioned second setting voltage without charging or discharging the above-mentioned oscillation capacitor when the above-mentioned oscillation voltage reaches the above-mentioned second setting voltage.

In the DC—DC converter of the present invention, the above-mentioned oscillation circuit may be configured so as to generate an oscillation voltage in triangular wave form that rises or lowers cyclically between the first setting voltage and the second setting voltage lower than the above-mentioned first setting voltage, the oscillation voltage, the cycle of which decreases corresponding to the increase of the difference between the above-mentioned error voltage and the above-mentioned first setting voltage when the above-mentioned error voltage is higher than the above-mentioned first setting voltage, and the oscillation voltage, the cycle of which decreases corresponding to the increase of the difference between the above-mentioned error voltage and the above-mentioned second setting voltage when the above-mentioned error voltage is lower than the above-mentioned second setting voltage.

In the DC—DC converter of the present invention, the above-mentioned error amplifying circuit is configured so as to output the error voltage that rises as the above-mentioned direct current output voltage becomes lower than the above-mentioned predetermined voltage, and lowers as the above-mentioned direct current output voltage becomes higher than the above-mentioned predetermined voltage.

The above-mentioned oscillation circuit is configured so as to increase the ratio of rising time per one cycle of the above-mentioned oscillation voltage as the difference between the above-mentioned error voltage and the above-mentioned second setting voltage increases when the above-mentioned error voltage is lower than the above-mentioned second setting voltage, and to increase the ratio of rising time per one cycle of the above-mentioned oscillation voltage as the difference between the above-mentioned error voltage and the above-mentioned first setting voltage increases when the above-mentioned error voltage is higher than the above-mentioned first setting voltage.

The above-mentioned pulse width control circuit carries out control in the voltage step-down operation mode wherein the above-mentioned second switch is fixed at OFF state, and the above-mentioned first switch is turned to OFF state in the rising period of the above-mentioned oscillation voltage and turned to ON state in the remaining period in the case where the above-mentioned error voltage is lower than the above-mentioned second setting voltage. The above-mentioned pulse width control circuit carries out control in the voltage step-up operation mode wherein the above-mentioned first switch is fixed at ON state, and the above-mentioned second switch is turned to ON state in the rising period of the above-mentioned oscillation voltage and turned to OFF state in the remaining period in the case where the above-mentioned error voltage is higher than the above-mentioned first setting voltage. In the case where the above-mentioned error voltage coincides with the above-mentioned oscillation voltage occasionally, the above-mentioned pulse width control circuit further carries out control in the voltage step-up and step-down operation mode wherein the above-mentioned first switch is turned to OFF state in the period during which the above-mentioned error voltage is lower than the above-mentioned oscillation voltage in the rising period of the above-mentioned oscillation voltage and is turned to ON state in the remaining period, and the above-mentioned second switch is turned to ON state in the period during which the above-mentioned error voltage is higher than the above-mentioned oscillation voltage in the rising period of the above-mentioned oscillation voltage and is turned to OFF state in the remaining period.

In the DC—DC converter of the present invention, the above-mentioned oscillation circuit is configured so as to keep the rising speed of the above-mentioned oscillation voltage constant regardless of the change of the above-mentioned error voltage and to increase the lowering speed of the above-mentioned oscillation voltage as the above-mentioned error voltage becomes higher than the above-mentioned first setting voltage and as the above-mentioned error voltage becomes lower than the above-mentioned second setting voltage.

The above-mentioned pulse width control circuit may be configured so as to turn the above-mentioned first switch to ON state and to turn the above-mentioned second switch to OFF state in the lowering period of the above-mentioned oscillation voltage, and to turn both the above-mentioned first switch and the above-mentioned second switch to ON state in the case where the above-mentioned error voltage is higher than the above-mentioned oscillation voltage, and to turn both the above-mentioned first switch and the above-mentioned second switch to OFF state in the case where the above-mentioned error voltage is lower than the above-mentioned oscillation voltage in the rising period of the above-mentioned oscillation voltage.

In the DC—DC converter of the present invention, the above-mentioned error amplifying circuit is configured so as to output the error voltage that rises as the above-mentioned direct current output voltage becomes lower than the above-mentioned predetermined voltage, and lowers as the above-mentioned direct current output voltage becomes higher than the above-mentioned predetermined voltage.

The above-mentioned oscillation circuit is configured so as to keep the lowering speed of the above-mentioned oscillation voltage constant regardless of the change of the above-mentioned error voltage, and to increase the rising speed of the above-mentioned oscillation voltage as the above-mentioned error voltage becomes higher than the above-mentioned first setting voltage and as the above-mentioned error voltage becomes lower than the above-mentioned second setting voltage.

The above-mentioned pulse width control circuit may be configured so as to turn the above-mentioned first switch to ON state and to turn the above-mentioned second switch to OFF state in the rising period of the above-mentioned oscillation voltage, and to turn both the above-mentioned first switch and the above-mentioned second switch to ON state in the case where the above-mentioned error voltage is higher than the above-mentioned oscillation voltage, and to turn both the above-mentioned first switch and the above-mentioned second switch to OFF state in the case where the above-mentioned error voltage is lower than the above-mentioned oscillation voltage in the lowering period of the above-mentioned oscillation voltage.

In the DC—DC converter of the present invention, the above-mentioned oscillation circuit may be configured so as to extend the cycle of the above-mentioned oscillation voltage as the difference between the above-mentioned error voltage and a third setting voltage becomes larger in the case where the predetermined third setting voltage is compared with the above-mentioned error voltage and the above-mentioned error voltage exceeds the above-mentioned third setting voltage in the direction of lowering the above-mentioned direct current output voltage in the above-mentioned voltage step-down operation mode.

In the DC—DC converter of the present invention, with respect to the third setting voltage lower than the above-mentioned second setting voltage, the above-mentioned oscillation circuit may be configured so as to extend the cycle of the above-mentioned oscillation voltage as the difference between the above-mentioned error voltage and the above-mentioned third setting voltage becomes larger in the case where the above-mentioned error voltage is lower than the above-mentioned third setting voltage.

In the DC—DC converter of the present invention, with respect to the third setting voltage. lower than the above-mentioned second setting voltage, the above-mentioned oscillation circuit may be configured so as to slow the lowering speed of the above-mentioned oscillation voltage as the difference between the above-mentioned error voltage and the above-mentioned third setting voltage becomes larger in the case where the above-mentioned error voltage is lower than the above-mentioned third setting voltage.

In the DC—DC converter of the present invention, with respect to the third setting voltage lower than the above-mentioned second setting voltage, the above-mentioned oscillation circuit may be configured so as to slow the rising speed of the above-mentioned oscillation voltage as the difference between the above-mentioned error voltage and the above-mentioned third setting voltage becomes larger in the case where the above-mentioned error voltage is lower than the above-mentioned third setting voltage.

In the DC—DC converter of the present invention, the above-mentioned third setting voltage may be set closer to the above-mentioned second setting voltage as the above-mentioned direct current input voltage becomes lower.

In the DC—DC converter of the present invention, the above-mentioned control section may be configured so as to have a predetermined hysteresis characteristic in the operation of comparing the above-mentioned error voltage with the above-mentioned first setting voltage.

In the DC—DC converter of the present invention, the above-mentioned oscillation circuit may be configured so as to make smaller the ratio of the rising time per one cycle of the above-mentioned oscillation voltage when the above-mentioned error voltage becomes higher than the above-mentioned first setting voltage.

In the DC—DC converter of the present invention, the above-mentioned control section may be configured to have a predetermined hysteresis characteristic in the operation of comparing the above-mentioned error voltage with the above-mentioned second setting voltage.

In the DC—DC converter of the present invention, the above-mentioned oscillation circuit may be configured so as to make smaller the ratio of the rising time per one cycle of the above-mentioned oscillation voltage when the above-mentioned error voltage is lower than the above-mentioned second setting voltage.

The DC—DC converter of the present invention is a voltage step-up and step-down typed DC—DC converter, comprising a voltage step-down converter section having a first switch, a voltage step-up converter section having a second switch and a control section for turning ON and OFF the above-mentioned first switch and the above-mentioned second switch, respectively, for receiving a direct current input voltage and outputting a direct current output voltage to a load.

The above-mentioned control section carries out the voltage step-up and step-down operation in which respective driving signals that turn ON and OFF the above-mentioned first switch and the above-mentioned second switch are sent in the case where an oscillation voltage is compared with the error voltage corresponding to the above-mentioned direct current output voltage and the above-mentioned oscillation voltage coincides with the above-mentioned error voltage occasionally. In the case where the above-mentioned error voltage does not coincide with the above-mentioned oscillation voltage, the above-mentioned control section, by the difference between the above-mentioned oscillation voltage and the above-mentioned error voltage, carries out the voltage step-down operation in which the above-mentioned second switch is fixed at OFF state and the above-mentioned first switch is turned ON and OFF, in the case where the above-mentioned error voltage does not coincide with the above-mentioned oscillation voltage, or carries out the voltage step-up operation in which the above-mentioned first switch is fixed at ON state and the above-mentioned second switch is turned ON and OFF.

The DC—DC converter of the present invention configured as described above enables control from voltage step-up to voltage step-up and step-down and further to voltage step-down by comparing one oscillation circuit with one error voltage, whereby the configuration of the control section can be simplified.

BEST MODE FOR CARRYING OUT THE INVENTION

Preferred embodiments of a DC—DC converter according to the present invention will be described below referring to the accompanying FIG. 1 to FIG. 9.

FIRST EMBODIMENT

A first embodiment of the present invention will be described referring to FIG. 1 to FIG. 3.

Figure 1:
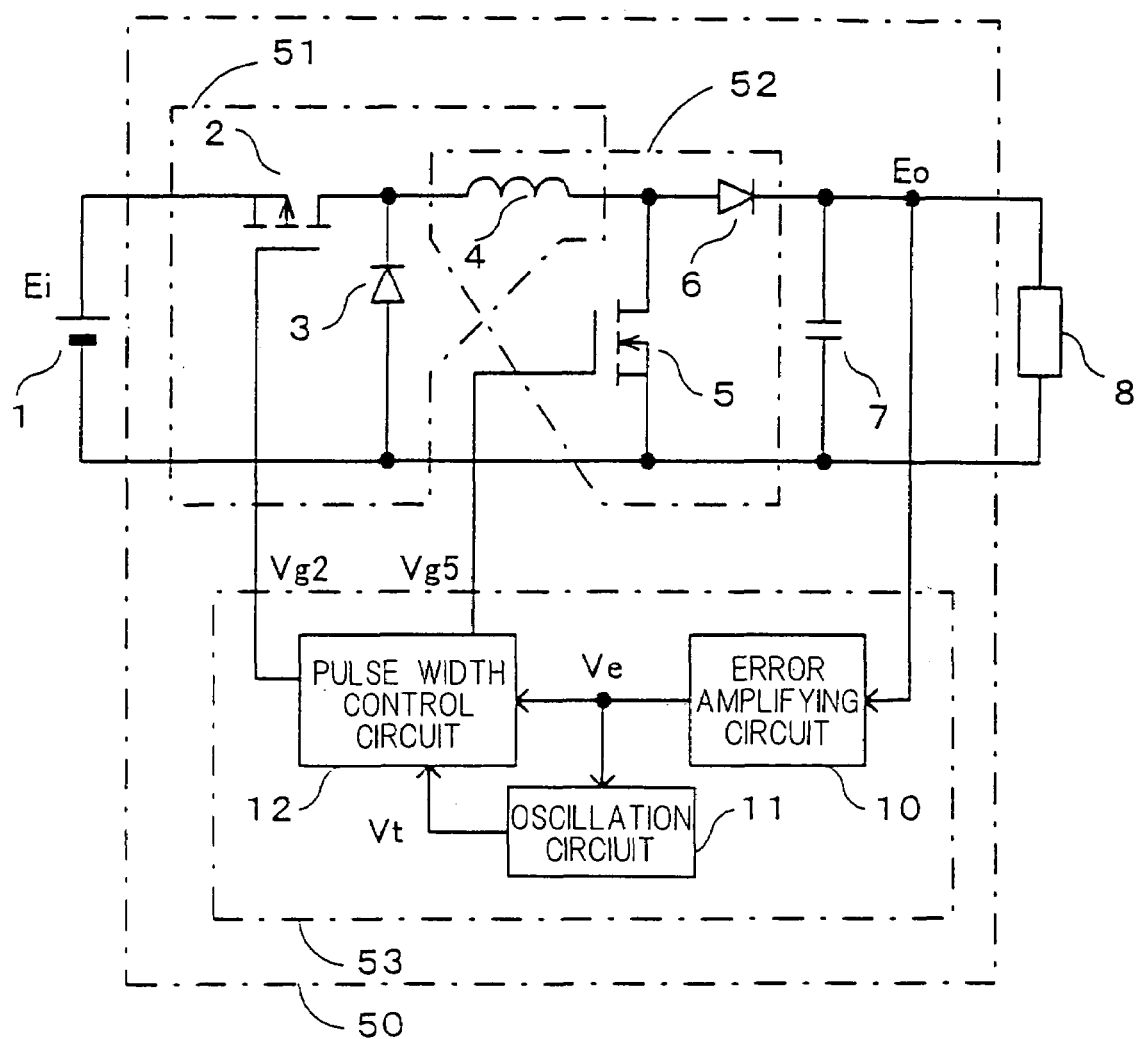
FIG. 1 is a circuit diagram showing configuration of a DC—DC converter in accordance with a first embodiment of the present invention.

FIG. 1 is a circuit diagram showing configuration of a DC—DC converter in accordance with the first embodiment of the present invention. In FIG. 1, the DC—DC converter 50 of the first embodiment comprises a voltage step-down converter 51 consisting of a first switch 2 formed of a P-channel MOSFET, which is connected to a direct current input power source 1 of a voltage Ei, a first rectifying section 3 as a diode and an inductor 4; a voltage step-up converter 52 consisting of a second switch 5 formed of N-channel MOSFET and a second rectifying section 6 as a diode, having the inductor 4 in common; and an output capacitor 7. A voltage Eo between both terminals of the output capacitor 7 is applied to a load 8 as a direct current output voltage.

The first switch 2, the inductor 4 and the second switch 5 are connected in series across a positive pole 1A and a negative pole 1B of the direct current power source 1. When both the first switch 2 and the second switch 5 are turned ON, the direct current input voltage Ei is applied to the inductor 4. The first rectifying means 3, the inductor 4 and the second rectifying means 6 are connected in series and when both the first rectifying means 3 and the second rectifying means 6 are turned ON, voltage of the inductor 4 is applied to the output capacitor 7.

The control section 53 for controlling ON and OFF of the first switch 2 and the second switch 5 comprises an error amplifying circuit 10, an oscillation circuit 11 and a pulse width control circuit 12. The error amplifying circuit 10 detects the direct current output voltage Eo and outputs an error voltage Ve. The oscillation circuit 11 outputs an oscillation voltage Vt. The pulse width control circuit 12 receives inputs of the error voltage Ve and the oscillation voltage Vt and outputs a driving voltage Vg2 for driving the first switch 2 to be turned ON and OFF and a driving voltage Vg5 for driving the second switch 5 to be turned ON and OFF.

Figure 2:
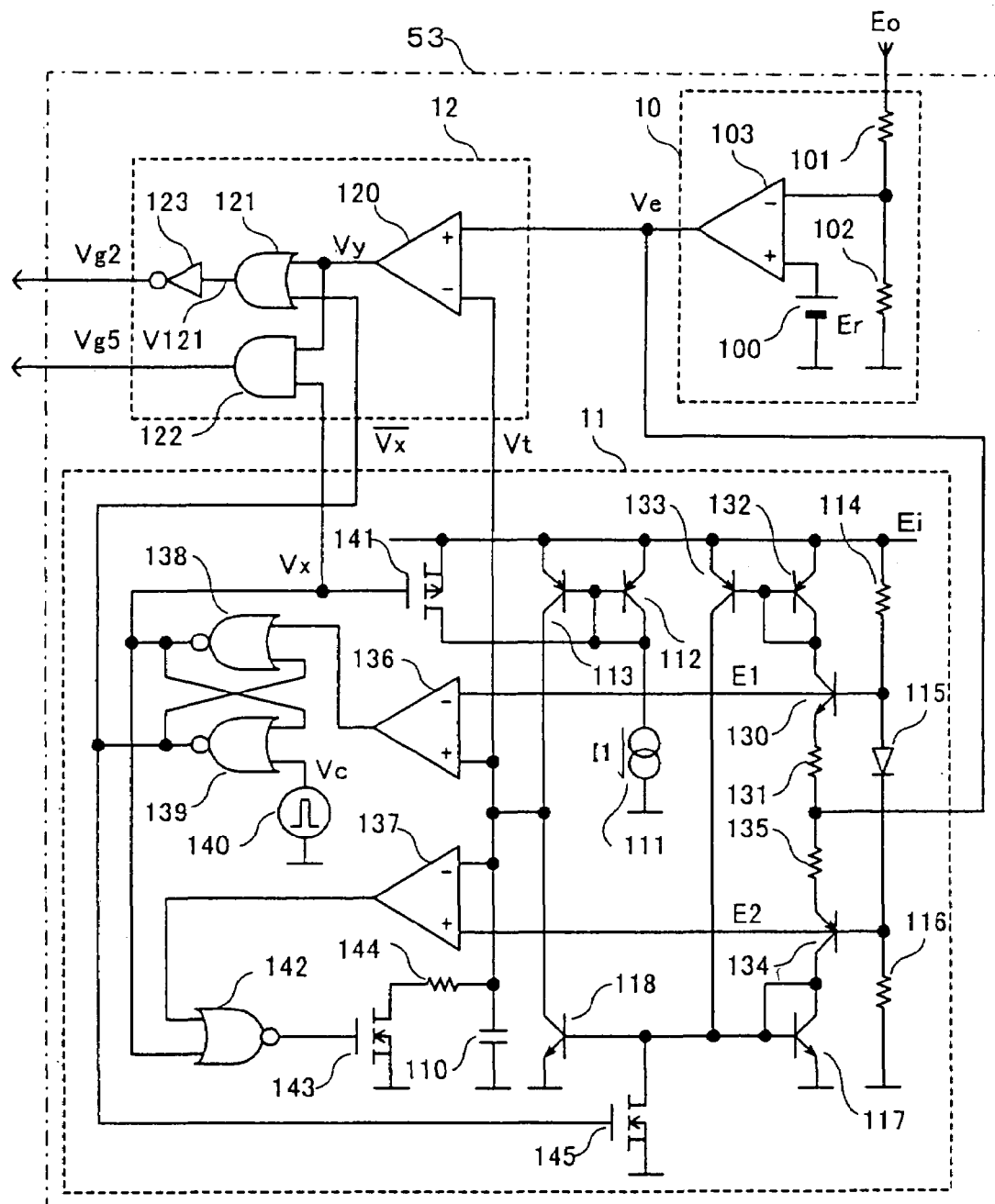
FIG. 2 is a circuit diagram showing configuration of a control section of the DC—DC converter in accordance with the first embodiment of the present invention.

FIG. 2 is a detailed circuit diagram of the error amplifying circuit 10, the oscillation circuit 11 and the pulse width control circuit 12.

In FIG. 2, the error amplifying circuit 10 comprises a reference voltage source 100, two resistors 101 and 102 connected in series for dividing the direct current output voltage Eo and an error amplifier 103 for comparing a voltage Er of the reference voltage source 100 with detected voltage, amplifying the error of comparison result and outputting the error signal Ve.

The oscillation circuit 11 comprises an oscillation capacitor 110 having a capacitance C and a constant current circuit 111, and comprises a mirror circuit consisting of an PNP transistor 112 and an PNP transistor 113 for charging the oscillation capacitor 110 by a constant current I1 flowing through a constant current circuit 111. Moreover, a series circuit of a resistor 114, a diode 115 and a resistor 116 provided for dividing the direct current input voltage Ei and outputting a first setting voltage E1 and a second setting voltage E2. The circuit further comprises a current mirror circuit consisting of an NPN transistor 117 and an NPN transistor 118 for discharging the oscillation capacitor 110, and an NPN transistor 130, a base terminal of which is connected to an output point of the first setting voltage E1. A resistor 131 is connected between the emitter terminal of the NPN transistor 130 and the output terminal of the error amplifier 103.

A current mirror circuit consisting of a PNP transistor 132 and a PNP transistor 133 is configured so that the current flowing through the resistor 131 is supplied to a current mirror circuit consisting of an NPN transistor 117 and an NPN transistor 118. The second setting voltage E2 is applied to the base terminal of a PNP transistor 134, and the collector terminal thereof is connected to the base terminal of the NPN transistor 117. A resistor 135 is connected between the emitter terminal of the PNP transistor 134 and the output terminal of the error amplifier 103. A comparator 136 compares the first setting voltage E1 with the voltage Vt of the oscillation capacitor 110. A comparator 137 compares the second setting voltage E2 with the voltage Vt of the oscillation capacitor 110. The output of the comparator 136 is input to an NOR circuit 138, and an NOR circuit 139 and the NOR circuit 138 form a flip-flop.

A clock signal source 140 outputs a one shot pulse of cycle T to the NOR circuit 139. A P-channel MOSFET 141 is driven by an output Vx of the NOR circuit 138, and short-circuits across the emitter and the base of the current mirror circuit consisting of the PNP transistor 112 and the PNP transistor 113. The output of an NOR circuit 142 to which an output Vx of the NOR circuit 138 and the output of the comparator 137 are input is applied to the gate of an N-channel MOSFET 143 and drives it.

The oscillation capacitor 110 is discharged via the N-channel MOSFET 143 and a resistor 144 connected thereto. An N-channel MOSFET 145 which is driven by the application of the output of the NOR circuit 139 to the gate short-circuits across the emitter and the base of the current mirror circuit consisting of the PNP transistor 117 and the PNP transistor 118.

The pulse width control circuit 12 comprises a comparator 120 for comparing the output voltage Ve of the error amplifier 103 with the voltage Vt of the oscillation capacitor 110. An output Vy of the comparator 120 and the output of the NOR circuit 139 are input to an OR circuit 121. The output Vy of the comparator 120 and the output Vx of the NOR circuit 138 are input to an AND circuit 122. The output of the OR circuit 121 is input to the first switch 2 via an inverter 123. It becomes a driving voltage Vg2 of the first switch 2. The output of the AND circuit 122 is a driving voltage Vg5 of the second switch 5.

Operation of the DC—DC converter in accordance with the first embodiment configured as mentioned above will be described below.

The first switch 2 and the second switch 5 carry out the ON and OFF operation at the same switching cycle T by means of the control section 53. The duty ratios which are ratios of respective ON times of the first switch 2 and the second switch 5 in one switching cycle are designated as $\delta 1$ and $\delta 2$, respectively. It is assumed that in a period when the second switch 5 is in the ON state, the first switch 2 is also in the ON state, and the duty ratio $\delta 1$ is larger than the duty ratio $\delta 2$: ($\delta 1 > \delta 2$). For convenience of description, the forward voltage drops of the first rectifying section and the second rectifying section in the ON state are ignored.

First, when both the first switch 2 and the second switch 5 are in the ON state, the voltage Ei of the direct current input power source 1 is applied to the inductor 4. The application period is represented by the product of the duty ratio $\delta 2$ by the cycle T: ($\delta 2 \cdot T$). In this period, a current flows from the direct current input power source 1 to the inductor 4, and magnetic energy is stored therein.

Next, when both the first switch 2 and the second switch 5 are in the OFF state, the first rectifying section 3 and the second rectifying section 6 turn to ON state, and the direct current output voltage Eo is applied to the inductor 4 in the reverse direction. The application period is represented by the value obtained by subtracting the product of the duty ratio $\delta 1$ by the cycle T from the cycle T: ($T-\delta 1 \cdot T$), and a current flows from the inductor 4 to the output capacitor 7, and the stored magnetic energy is released.

Finally, when the first switch 2 is in the ON state and the second switch 5 is in the OFF state, the second rectifying section 6 turns to ON state, and the voltage of difference between the direct current input voltage Ei and the direct current output voltage Eo: (Ei–Eo) is applied to the inductor 4. This period is represented by the equation ($\delta 1 \cdot T - \delta 2 \cdot T$) and a current flows from the direct current input power source 1 to the output capacitor 7 via the inductor 4.

As described above, by repeating the operation of storage and release of magnetic energy, electric power is supplied from the output capacitor 7 to the load 8. In a stable operation state wherein the storage and the release of magnetic energy at the inductor 4 balance, since the sum of the product of applied voltages and times of application to the inductor 4 is zero, the below-mentioned equation (4) is established.

$$Ei \cdot \delta 2 \cdot T + (Ei-Eo)(\delta 1 \cdot T - \delta 2 \cdot T) - Eo(T - \delta 1 \cdot T) = 0 \quad (4)$$

By arranging the above-mentioned equation (4), a conversion characteristic equation represented by the following equation (5) is obtained.

$$Eo/Ei = \delta 1/(1-\delta 2) \quad (5)$$

As understood from the above-mentioned conversion characteristic equation (5), by controlling the duty ratios $\delta 1$ and $\delta 2$, the arbitrary direct current output voltage Eo can be theoretically obtained from the arbitrary direct current input voltage Ei, enabling the DC—DC converter to operate as a step-up and step-down converter.

When the duty ratio $\delta 2$ is zero: ($\delta 2 = 0$), in which the second switch 5 is in the OFF state at all times, the operation enters the voltage step-down mode wherein the converter operates as a voltage step-down converter as represented by the following equation (6).

$$Eo/Ei = \delta 1 \quad (6)$$

When the duty ratio $\delta 1$ is equal to 1: ($\delta 1 = 1$), in which the first switch 2 is in the ON state at all times, the operation enters the voltage step-up mode wherein the converter operates as a voltage step-up converter as represented by the following equation (7).

$$Eo/Ei=1/(1-\delta 2) \quad (7)$$

Figure 3:
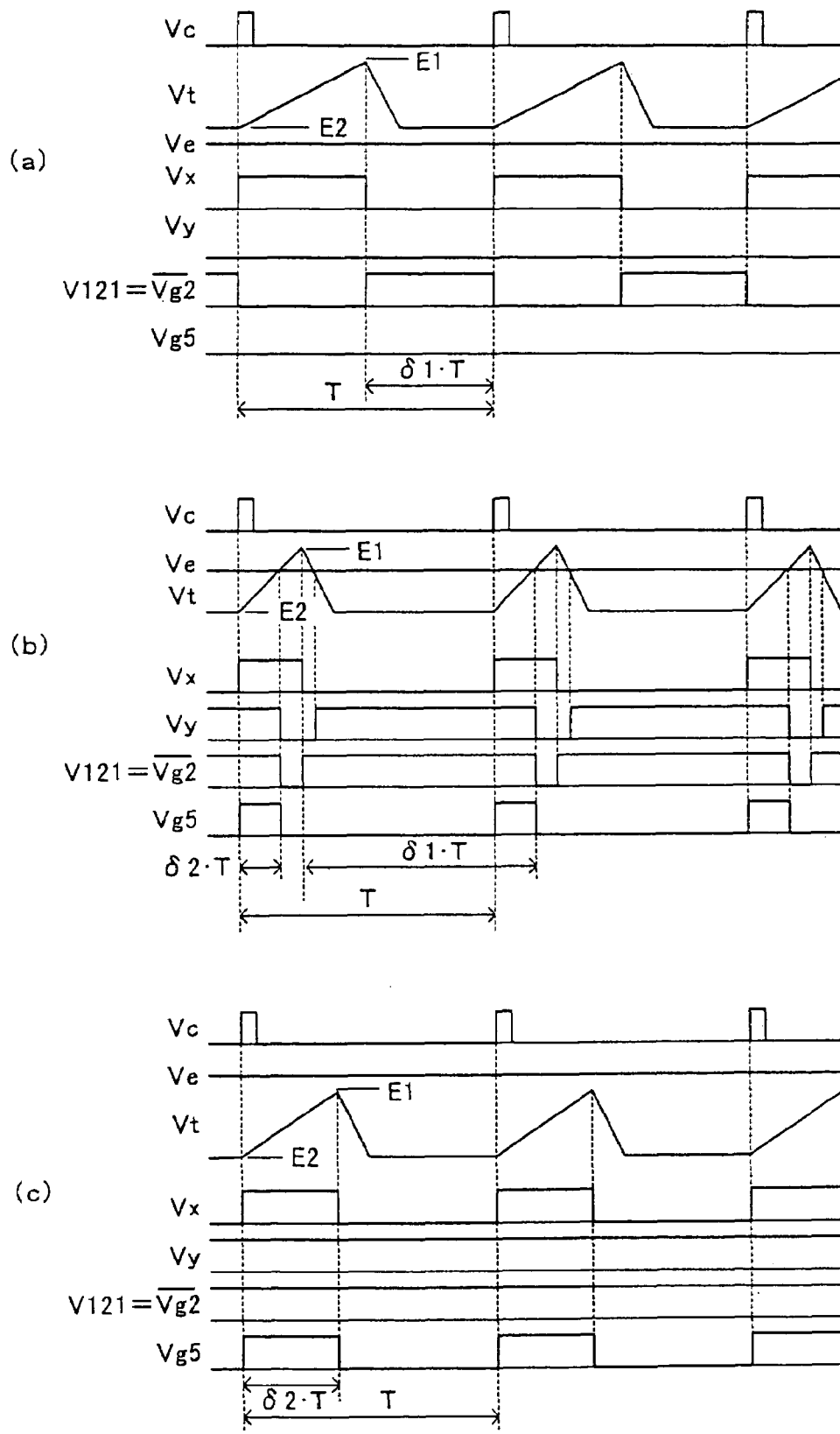
FIGS. 3(a) to 3(c) are waveform diagrams showing operations of each section of the control section of the DC—DC converter in accordance with the first embodiment of the present invention.

FIGS. 3(a) to 3(c) are waveform diagrams of each section of the control section 53 shown in FIG. 2. FIGS. 3(a) to 3(c) show waveforms of the pulse output Vc of the clock signal source 140, the oscillation voltage Vt of the oscillation capacitor 110, the error voltage Ve of the error amplifying circuit 10, the output Vx of the NOR circuit 138, the output Vy of the comparator 120 in the pulse width control circuit 12, the output V121 of the OR circuit 121 and the driving voltage Vg5 for the second switch 5. The reason why FIG. 3 shows the output V121 of the OR circuit 121 which is a turnover voltage of the driving voltage Vg2 for the first switch 2, not the driving voltage Vg2 is as follows.

Since the first switch 2 is a P-channel MOSFET, it turns to ON state when the driving voltage Vg2 applied to the gate is "L" ("low" of logical level) and turns to OFF state when it is "H" ("high" of logical level). Therefore, the waveform representing ON and OFF states represent an opposite meaning to waveform of an ordinary switch that turns OFF at "L" and turns ON at "H", whereby confusion is liable to cause. In FIG. 2, logical NOR of the output Vy of the comparator 120 and the output of the NOR circuit 139 should be set to the driving voltage Vg2, but in order to facilitate understanding, it is configured by the OR circuit and the inverter 123, and the output V121 of the OR circuit 121 is shown in FIG. 3. In other words, in FIG. 3, to be easily understandable, the first switch turns to ON state at "H" and turns to OFF state at "L" by representing the output V121 of the OR circuit 121. FIG. 3(a) shows the case wherein the oscillation voltage Vt is larger than the error voltage Ve, FIG. 3(b) shows the case wherein the waveforms of the oscillation voltage Vt and the error voltage Ve intersect with each other, that is, coincide with each other occasionally, and FIG. 3(c) shows the case wherein the oscillation voltage Vt is smaller than the error voltage Ve.

Operation of the control section 53 will be described with reference to FIG. 2 and FIG. 3. For convenience of description, it is assumed that the forward voltage drop of the diode, that is, the base-emitter voltage of the NPN transistor in the ON state and the base-emitter voltage of the PNP transistor in the ON state are equal, and this value is represented by a voltage Vd. The voltage Vd is equal to the difference between the first setting voltage E1 and the second setting voltage E2.

The error voltage Ve output from the error amplifying circuit 10 lowers when the voltage detected by dividing the direct current output voltage Eo by the resistor 101 and the resistor 102 is higher than the reference voltage Er of the reference voltage source 100, and rises when the voltage is lower the reference voltage Er. In other words, the error voltage Ve lowers when the direct current input voltage Ei becomes higher or the direct current output voltage Eo rises owing to decrease in the load 8. On the contrary, the error voltage Ve rises when the direct current input voltage Ei becomes lower or the direct current output voltage Eo lowers owing to increase in the load 8. FIG. 3(a) shows the state wherein the error voltage Ve is lower than the oscillation voltage Vt, and the direct current input voltage Ei is higher than the direct current output voltage Eo. FIG. 3(b) shows the state wherein waveforms of the error voltage Ve and the oscillation voltage Vt cross with each other, and the direct current input voltage Ei is close to the direct current output voltage Eo. The FIG. 3(c) shows the state wherein the error voltage Ve is higher than the oscillation voltage Vt and the direct current input voltage Ei is lower than the oscillation voltage Vt.

The oscillation capacitor 110 of the oscillation circuit 11 is charged or discharged between the first setting voltage E1 and the second setting voltage E2: (E2<E1), and outputs the oscillation voltage Vt. This charge period starts at receiving the pulse signal Vc from the clock signal source 140.

First, the NOR circuit 139 outputs "L" and the output Vx of the NOR circuit 138 constituting a flip-flop in combination with the NOR circuit 139 turns to "H". For this reason, the FET 141 turns to OFF state, and the current I1 of the constant current source 111 flows to the oscillation capacitor 110 through the current mirror circuit consisting of the PNP transistor 112 and the PNP transistor 113, whereby the oscillation capacitor 110 is charged. Since the FET 143 is in the OFF state, discharge by the resistor 144 is not performed. However, since the FET 145 is in the OFF state, discharge by the current mirror circuit consisting of the NPN transistor 117 and the NPN transistor 118 is performed. The discharge current by the current mirror circuit consisting of the NPN transistor 117 and the NPN transistor 118 is determined depending on the error voltage Ve.

As shown in FIG. 3(b), in the case where the error voltage Ve is between the first setting voltage E1 and the second setting voltage E2, both the NPN transistor 130 and the PNP transistor 134 turn to OFF state. Therefore, there is no current discharged from the oscillation capacitor 110 through the current mirror circuit consisting of the NPN transistor 117 and the NPN transistor 118, and the oscillation capacitor 110 is charged by the constant current I1. Therefore, charge speed of the oscillation capacitor 110, that is, rising speed of the oscillation voltage Vt is constant.

As shown in FIG. 3(a), when the error voltage Ve is lower than the second setting voltage E2, the PNP transistor 134 turns to OFF state, and the NPN transistor 130 turns to ON state, whereby a current flows to the resistor 131. The voltage obtained by subtracting the voltage Vd and the error voltage Ve from the first setting voltage E1: (E1−Vd−Ve) is applied to the resistor 131. Since the second setting voltage E2 is equal to the difference between the first setting voltage E1 and the voltage Vd: (E2=E1−Vd), when it is assumed that the value of resistance of the resistor 131 is R131, the current flowing through the resistor 131 is calculated by the equation (E2−Ve)/R131. This current flows from the oscillation capacitor 110 through the current mirror circuit including the PNP transistor 132 and the PNP transistor 133 as well as the current mirror circuit including the NPN transistor 117 and the NPN transistor 118, whereby the oscillation capacitor 110 is discharged. However, this current is set as not to be larger than the constant current I1 even when the voltage Ve becomes lowest. Therefore, the oscillation capacitor 110 is charged by the current I131 represented by the following equation (8).

$$I131=I1-(E2-Ve)/R131 \quad (8)$$

As the error voltage Ve becomes lower than the second setting voltage E2, the charge current I131 becomes smaller and a charge speed of the oscillation capacitor 110, that is, rising speed of the oscillation voltage Vt becomes slower.

As shown in FIG. 3(c), in the case where the error voltage Ve is higher than the first setting voltage E1, the NPN transistor 130 turns to OFF state and the PNP transistor 134 turns to ON state, whereby a current flows through the resistor 135. The voltage represented by the equation (Ve−(E2+Vd)) is applied to the resistor 135. Since the first setting voltage E1 is the sum of the second setting voltage E2 and the voltage Vd: (E1=E2+Vd), when it is assumed that the value of resistance of the resistor 135 is R135, the current flowing through the resistor 135 is represented by the equation (Ve−E1)/R135. This current flows through the current mirror circuit including the NPN transistor 117 and the NPN transistor 118, whereby the oscillation capacitor 110 is discharged. However, this current is set as not to be larger than the constant current I1 even when the voltage Ve becomes highest. Therefore, the oscillation capacitor 110 is charged at a current I135 represented by the following equation (9).

$$I135=I1-(Ve-E1)/R135 \quad (9)$$

As the error voltage Ve becomes higher than the first setting voltage E1, the charge current I135 becomes smaller and charge speed of the oscillation capacitor 110, that is, rising speed of the oscillation voltage Vt becomes slower.

Charge of the oscillation voltage 110 proceeds, and when the oscillation voltage Vt reaches the first setting voltage E1, the output of the comparator 136 turns "H" and the output Vx of the NOR circuit 138 of the flip-flop turns "L". At the same time, the output Vx of the NOR circuit 139 turns "H". When the output Vx is "L", the FET 141 turns to ON state and the PNP transistor 113 turns to OFF state, thereby stopping the charge current to the oscillation capacitor 110. Since the output of the NOR circuit 142 is "H", the FET 143 turns to ON state and the oscillation capacitor 110 is discharged by the resistor 144. The FET 145 which receives the output of "H" from the NOR circuit 139, turns to ON state. Consequently, the NPN transistor 118 turns to OFF state and discharge of the oscillation capacitor 110 through the NPN transistor 118 is stopped. Therefore, the oscillation capacitor 110 is discharged via only the resistor 144, and the oscillation voltage Vt decreases.

When discharge of the oscillation voltage 110 proceeds and when the oscillation voltage Vt reaches the second setting voltage E2, the output of the comparator 137 turns "H" and the output Vx of the NOR circuit 142 turns "L". Hence, the FET 143 turns to OFF state and discharge of the oscillation capacitor 110 is stopped. Since the oscillation capacitor 110 is not charged nor discharged in this state, the oscillation voltage Vt is maintained at the voltage slightly lower than the second setting voltage E2. In this state, the input of a next pulse signal from the clock signal source 140 is waited. When the pulse signal is input from the clock signal source 140, the output of the flip-flop formed of the NOR circuit 138 and the NOR circuit 139 is inverted. Consequently, charge is restarted.

As mentioned above, the oscillation capacitor 110 is charged or discharged between the first setting voltage E1 and the second setting voltage E2, and outputs the oscillation voltage Vt. In the first embodiment, since the potential difference between the first setting voltage E1 and the second setting voltage E2 is Vd, the rising period Tc of the oscillation voltage Vt is represented by the following equations (10) to (12).

When Ve<E2, $$Tc=C \cdot R131 \cdot Vd/(E2-Ve) \quad (10)$$

When E2≦Ve≦E1, $$Tc=C \cdot Vd/I1 \quad (11)$$

When Ve>E1, $$Tc=C \cdot R135 \cdot Vd/(Ve-E1) \quad (12)$$

In the pulse width control circuit 12, the output V121 of logical sum obtained by inputting the output Vy of the comparator 120 and the output of the NOR circuit 139 to the OR circuit 121 is input to the inverter 123 and inverted, whereby the driving voltage Vg2 can be obtained as output. The driving voltage Vg2 turns "H" in the rising period of the oscillation voltage Vt during which the output Vx is "H", and in a period during which the voltage Ve is smaller than the oscillation voltage Vt: (Ve<Vt) and the output Vy is "L". In other words, the first switch 2 turns to OFF state only in the above-mentioned period (Ve<Vt) in the rising period of the oscillation voltage Vt.

On the other hand, the driving voltage Vg5 as logical product can be obtained by inputting the output Vy of the comparator 120 and the output Vx of the NOR circuit 138 to the AND circuit 122. The driving voltage Vg5 turns "H" in the rising period of the oscillation voltage Vt during which the output Vx is "H" and in a period during which the voltage Ve is higher than the oscillation voltage Vt: (Ve>Vt) and output thereof. Vy is "H". In other words, the second switch 5 turns to ON state only in the above-mentioned period (Ve>Vt) in the rising period of the oscillation voltage Vt.

As shown in FIG. 3(a) in the case where the direct current input voltage Ei is higher than the direct current output voltage Eo, and the error voltage Ve is lower than the oscillation voltage Vt, the output Vy of the comparator 120 is "L" at all times, and therefore the driving voltage Vg5 is "L" at all times and the second switch 5 is in the OFF state at all times. On the other hand, since the output V121 of the OR circuit 121, that is, the inverted voltage of the driving voltage Vg2 becomes "L" in the rising period of the oscillation voltage Vt, the first switch 2 is in the OFF state in the rising period of the oscillation voltage Vt and in the ON state in the remaining period. The OFF period (1−δ1)T during which the first switch 2 is in the OFF state is represented by the following equation (13).

$$(1-\delta 1)T=Tc=C \cdot R131 \cdot Vd/(E2-Ve) \quad (13)$$

In this case, the DC—DC converter in accordance with the first embodiment enters the voltage step-down operation mode wherein it operates with the duty ratio δ1 represented by the following equation (14).

$$\delta 1=1-C \cdot R131 \cdot Vd/(E2-Ve)/T \quad (14)$$

The lower the error voltage Ve becomes, the smaller the duty ratio δ1 of the first switch 2 becomes. By controlling so that the error voltage Ve lowers and the duty ratio δ1 becomes smaller as the direct current input voltage Ei becomes higher, the direct current output voltage Eo can be stabilized.

As shown in FIG. 3(b), in the case where the value of the direct current input voltage Ei is close to that of the direct current output voltage Eo and the waveform of the error voltage Ve intersects that of the oscillation voltage Vt, that is, the error voltage Ve coincides with the oscillation voltage Vt occasionally, the second switch 5 turns to ON state only in the period during which the error voltage Ve is larger than the oscillation voltage Vt: (Ve>Vt) in the rising period Tc of the oscillation voltage Vt. The first switch 2 turns to OFF state only in the period during which the error voltage Ve is smaller than the oscillation voltage Vt: (Ve<Vt) in the rising period Tc of the oscillation voltage Vt. In the rising period Tc of the oscillation voltage Vt, the period in (Ve>Vt) is represented by the equation C(Ve−E2)/I1, and the period in Ve<Vt is represented by the equation C(E1−Ve)/I1. Therefore, the operation mode of the DC—DC converter in accordance with the first embodiment is the voltage step-up and step-down operation mode wherein the first switch 2 carries out the ON and OFF operation at the duty ratio δ1 represented by the following equation (15), and the second switch 5 carries out the ON and OFF operation at the duty ratio δ2 represented by the following equation (16).

$$\delta 1 = 1 - C(E1 - Ve)/I1/T \quad (15)$$

$$\delta 2 = C(Ve - E2)/T \quad (16)$$

The smaller the error voltage Ve lowers, the higher the direct current input voltage Ei becomes, and the duty ratio δ1 of the first switch 2 becomes smaller, and the duty ratio δ2 of the second switch 5 becomes smaller. Hence, the direct current output voltage Eo can be controlled so, as to stabilize.

As shown in FIG. 3(c), in the case where the direct current input voltage Ei is lower than the direct current output voltage Eo and the error voltage Ve is higher than the oscillation voltage Vt, the output Vy of the comparator 120 is "H" at all times. Therefore, the output V121 of the OR circuit 121, that is, the inverted voltage of the driving voltage Vg2 is "H" at all times, and the first switch 2 is in the ON state at all times. Since the driving voltage Vg5 is "H" in the rising period of the oscillation voltage Vt, the second switch 5 turns to ON state in the rising period of the oscillation voltage Vt, and turns to OFF state in the remaining period. The ON period δ2·T during which the second switch 5 turns to ON state is represented by the following equation (17).

$$\delta 2 \cdot T = Tc = C \cdot R135 \cdot Vd/(Ve - E1) \quad (17)$$

In this case, the DC—DC converter in accordance with the first embodiment enters the voltage step-up operation mode wherein it operates at the duty ratio δ2 represented by the following equation (18).

$$\delta 2 = C \cdot R135 \cdot Vd/(Ve - E1)/T \quad (18)$$

The duty ratio δ2 that decides the ON period of the second switch 5 becomes larger as the error voltage Ve rises. As the direct current input voltage Ei lowers, the error voltage Ve rises, and the duty ratio δ2 becomes larger. Hence, the direct current output voltage Eo can be controlled so as to stabilize.

As described above, by comparing one oscillation voltage Vt with one error voltage, the DC—DC converter in accordance with the first embodiment transmits two driving signals that carry out the ON and OFF operation of the first switch and the second switch. Hence, it becomes possible to control the voltage step-down operation, the voltage step-up or step-down operation, and the voltage step-up operation.

In the above-mentioned first embodiment, the description is made as to the case wherein the error voltage Ve of the error amplifying circuit 11 lowers when the direct current output voltage Eo rises, and rises when the direct current output voltage Eo lowers conversely. However, the present invention is not limited to this operation, and the reverse operation of the above-mentioned operation can be performed by reversing the driving signal Vg2 and the driving signal Vg5. Also in this case, an operation similar to the DC—DC converter in accordance with the first embodiment of the present invention is carried out.

The DC—DC converter in accordance with the first embodiment of the present invention has been configured so that the first setting voltage E1 and the second setting voltage E2 are obtained by voltage-dividing the direct current input voltage Ei by the resistor 114, the diode 115 and the resistor 116. This configuration in the first embodiment is adopted because the voltages for the mirror circuits can be obtained on the high-potential side and the low-potential side, and because the amplitude of the oscillation voltage Vt can be fixed. However, the effect of the present invention remains unchanged even if the first setting voltage E1 and the second setting voltage E2 are set by using the respective reference voltage sources and the like, and the present invention is not limited to the voltage dividing method.

In the method for controlling the DC—DC converter in accordance with the first embodiment of the present invention, the rising period of the oscillation voltage Vt is made longer as the error voltage Ve is higher than the first setting voltage E1 or the error voltage Ve is lower than the second setting voltage E2. On the other hand, the rising period of the oscillation voltage Vt is fixed at the minimum value when the error voltage Ve is equal to the second setting voltage E2 or more and is equal to the first setting voltage E1 or less (E2≦Ve≦E1). However, the present invention is not limited to the above-mentioned control method. For example, the present invention includes the configuration wherein another setting voltage Ex having a voltage between the first setting voltage E1 and when the second setting voltage E2 is set, the error voltage Ve is compared with the setting voltage Ex and the error voltage Ve is equal to the setting voltage Ex: (Ve=Ex), the rising period of the oscillation voltage Vt is minimized, and the rising period of the oscillation voltage Vt is made longer as the potential difference between the error voltage Ve and the setting voltage Ex becomes larger.

In the DC—DC converter in accordance with the first embodiment of the present invention, although the timing of charging the oscillation capacitor 110 is regulated by the pulse signal from the clock signal source 140, the clock signal source 140 may be provided outside the DC—DC converter in accordance with the first embodiment of the present invention. In other words, the DC—DC converter in accordance with the first embodiment of the present invention can be configured so as to have a receiving means for receiving an external signal, and operate as a DC—DC converter of external-synchronization-type that operates in synchronism with the external signal. Incidentally, in the DC—DC converter in accordance with the first embodiment, although the rising period of the oscillation voltage Vt is changed by the error voltage Ve and is controlled, it may be also controlled by changing the lowering period by the error voltage Ve. This also is applicable to a third embodiment to a sixth embodiment.

SECOND EMBODIMENT

A DC—DC converter in accordance with a second embodiment of the present invention will be described referring to FIG. 4 and FIG. 5.

Figure 4:
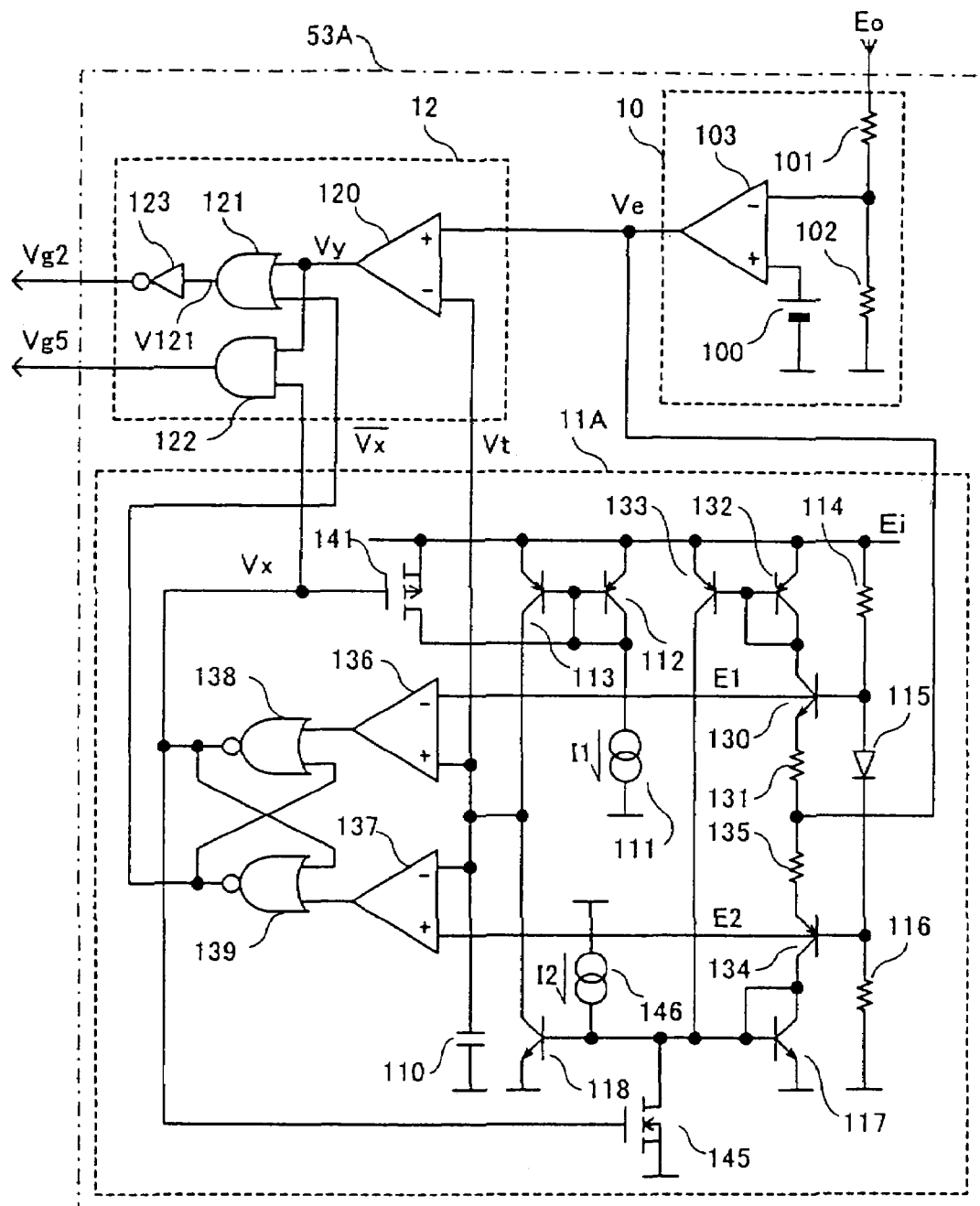
FIG. 4 is a circuit diagram showing configuration of a control section of a DC—DC converter in accordance with a second embodiment of the present invention.

FIG. 4 is a circuit diagram showing the configuration of a control section 53A of the DC—DC converter in accordance with the second embodiment of the present invention. The control section 53A is incorporated into the converter section 50 in place of the control section 53 shown in FIG. 1 to constitute the DC—DC converter in accordance with the second embodiment. In the control section 53A of the DC—DC converter in accordance with the second embodiment, the error amplifying circuit 10 and the pulse width control circuit 12 are the same as those of the control section 53 of the DC—DC converter in accordance with the first embodiment. Further, as will be described in detail below, an oscillation circuit 11A is the same as the above-mentioned oscillation circuit 11 of the control section 53 except for a part. In FIG. 4, the same reference numerals are applied to elements having the same function and configuration as those of the first embodiment and the descriptions thereof are omitted.

A constant current circuit 146 for supplying a constant current I2 is provided in the oscillation circuit 11A of the control section 53A of the DC—DC converter in accordance with the second embodiment shown in FIG. 4. The constant current circuit 146 supplies a current to the current mirror circuit including the NPN transistor 117 and the NPN transistor 118. The output of the comparator 137 in place of the clock signal source 140 in FIG. 2 is input to the NOR circuit 139 that forms a flip-flop. The output Vx of the NOR circuit 138 is input to the gate of the N-channel MOSFET 145 connected across the base and the emitter of the NPN transistor 117. The NOR circuit 142, N-channel MOSFET 143 and resistor 144 in FIG. 2 are not provided in the oscillation circuit 11A in FIG. 4. Other configuration of the control section 53A is the same as that of the above-mentioned control section 53. The DC—DC converter in accordance with the second embodiment thus configured will be described referring to FIG. 1 and FIG. 4. The DC—DC converter has a conversion characteristic represented by the following equation (19).

$$Eo/Ei=\delta1/(1-\delta2) \quad (19)$$

In the case where the duty ratio $\delta2$ is zero: ($\delta2=0$), in which the second switch 5 is in the OFF state at all times, the equation (19) turns into the following equation (20) and the operation enters the voltage step-down mode wherein the converter operates as a voltage step-down converter.

$$Eo/Ei=\delta1 \quad (20)$$

Furthermore, in the case where the duty ratio $\delta1$ is 1: $\delta1=1$), in which the first switch 2 is in the ON state at all times, the equation (19) turns into the following equation (21) and the operation enters the voltage step-up mode wherein the converter operates as a voltage step-up converter.

$$Eo/Ei=1/(1-\delta2) \quad (21)$$

As mentioned above, a conversion characteristic equation of input and output in the second embodiment is the same as that in the above-mentioned first embodiment.

Figure 5:
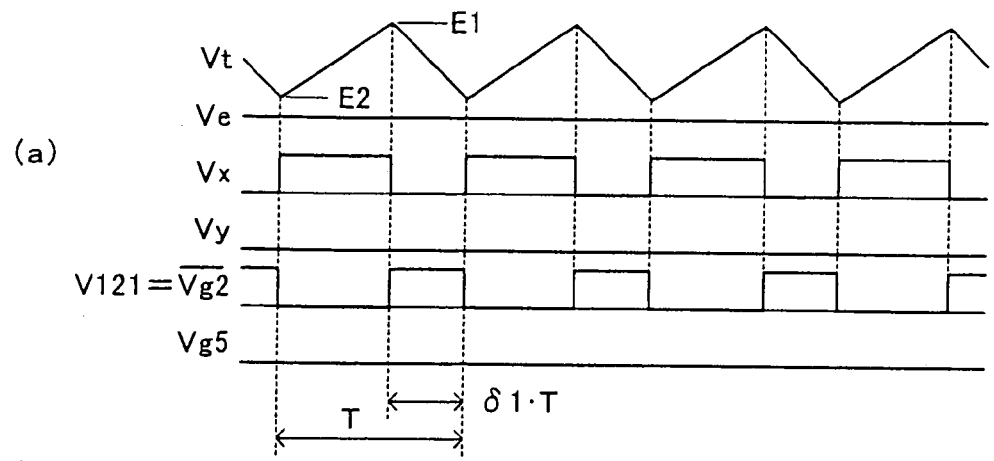
FIGS. 5(a) to 5(c) are waveform diagrams showing operations of each section of the control section of the DC—DC converter in accordance with the second embodiment of the present invention.
Figure 5:
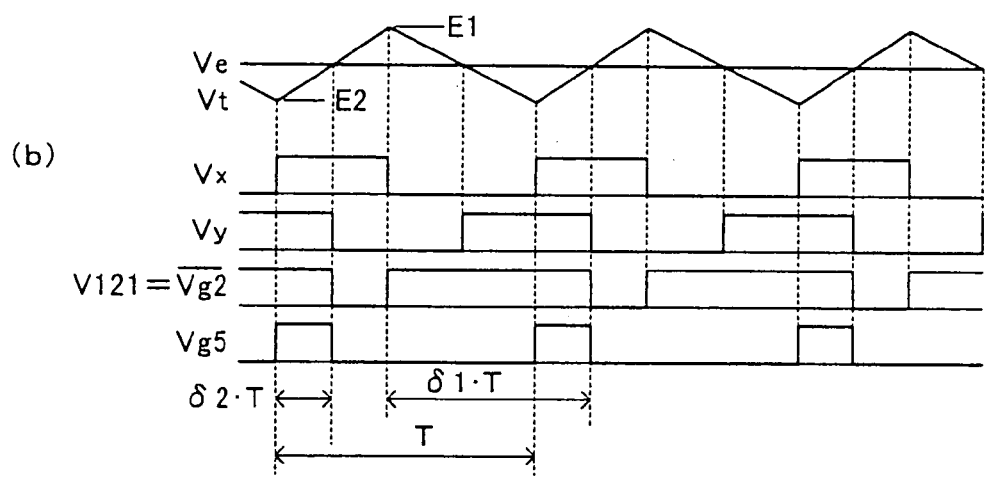
Figure 5:
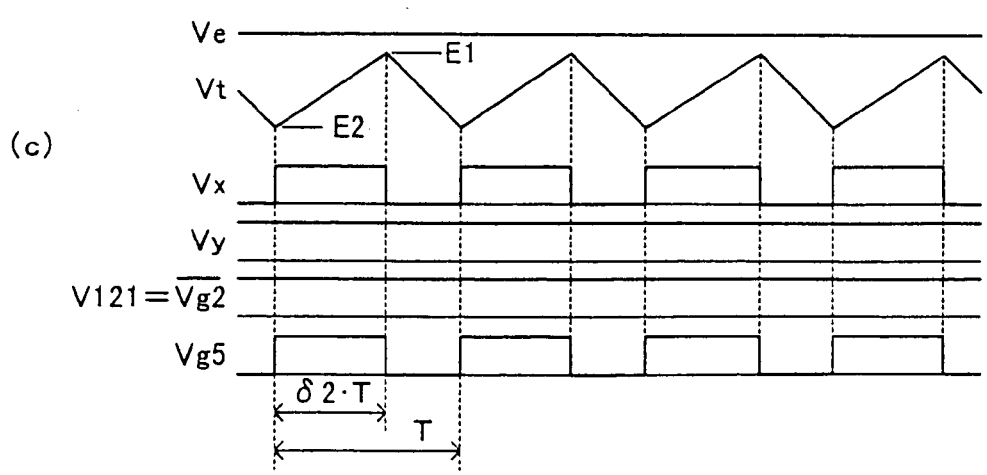

FIGS. 5(*a*) to 5(*c*) are waveform diagrams of each section of the control section 53A shown in FIG. 4. FIGS. 5(*a*) to 5(*c*) show each waveform of the oscillation voltage Vt, the error voltage Ve, the output Vx of the NOR circuit 138, the output Vy of the comparator 120, the output V121 of the OR circuit 121, that is, the inverted voltage of the driving voltage Vg2 of the first switch 2 and the driving voltage Vg5 of the second switch 5. FIG. 5(*a*) shows the case wherein the oscillation voltage Vt is larger than the error voltage Ve, 5(*b*) shows the case wherein the waveform of the oscillation voltage-Vt crosses that of the error voltage Ve, and 5(*c*) shows the case wherein the oscillation voltage Vt is smaller than the error voltage Ve.

Operation of the control section 53A shown in FIG. 4 will be described referring to FIGS. 5(*a*) to 5(*c*).

The error voltage Ve output from the error amplifying circuit 10 is similar to that of the DC—DC converter in accordance with the first embodiment, and lowers when the direct current input voltage Ei becomes higher or when the load 8 becomes lighter and the direct current output voltage Eo rises. Conversely, the error voltage Ve rises when the direct current input voltage Ei becomes lower or when the load 8 becomes heavier and the direct current output voltage Eo lowers. FIG. 5(*a*) shows the state wherein the direct current input voltage Ei is higher than the direct current output voltage Eo and the error voltage Ve is lower than the oscillation voltage Vt. FIG. 5(*b*) shows the state wherein the direct current input voltage Ei is close to the direct current output voltage Eo and the waveform of the error voltage Ve crosses that of the oscillation voltage Vt. FIG. 5(*c*) shows the state wherein the direct current input voltage Ei is lower than the direct current output voltage Eo and the error voltage Ve is higher than the oscillation voltage Vt.

The oscillation capacitor 110 of the oscillation circuit 11A is charged or discharged between the first setting voltage E1 and the second setting voltage E2: (E2<E1) and outputs the oscillation voltage Vt. This oscillation voltage Vt rises by supplying the current I1 of the constant current source 111 to charge the oscillation capacitor 110 through the current mirror circuit including the PNP transistor 112 and the PNP transistor 113, and the rising speed is constant. During this charge period, both outputs of the comparator 136 and the comparator 137 are "L", and the outputs of the flip-flop including the NOR circuits 138 and 139 to which two respective output signals of "L" are input are "H" in the output Vx of the NOR circuit 138, and "L" in the output of the NOR circuit 139. The signal Vx of "H" makes the FET 145 turn to ON state and the NPN transistor 118 that discharges the oscillation capacitor 110 turn to OFF state. It is assumed that the electrostatic capacitance of the oscillation capacitor 110 is C, the charge period, that is, the rising period Tc of the oscillation voltage Vt is represented by the following equation (22).

$$Tc=C(E1-E2)/I1=C\cdot Vd/I1 \quad (22)$$

When the voltage Vt of the oscillation capacitor 110 reaches the first setting voltage E1, the output of the comparator 136 turns to "H" and the output Vx of the NOR circuit 138 which forms the flip-flop, turns to "L" and the output of the NOR circuit is inverted to "H". The output Vx of "L" turns the FET 141 to ON state so that the PNP transistor 113 turns to OFF state, and turns the FET 145 to OFF state so that the NPN transistor 118 turns to ON state. Hence, the oscillation capacitor 110 is discharged. The discharge current flowing through the NPN transistor 118 that forms the current mirror circuit in combination with the NPN transistor 117 is the sum of the constant current I2 and the collector current of the PNP transistor 133 and the PNP transistor 134. The lowering period of the oscillation voltage Vt is set depending on the error voltage Ve as follows.

Firstly, in the case where the error voltage Ve is lower than the second setting voltage E2 as shown in FIG. 5(*a*), the voltage obtained by subtracting the voltage Vd and the error voltage Ve from the first setting voltage E1: (E1−Vd−Ve) is applied to the resistor 131. Since the voltage obtained by subtracting the voltage Vd from the first setting voltage E1 is equal to the second setting voltage E2: (E1−Vd=E2), when it is assumed that the value of resistance of the resistor 131 is R131, the current flowing through the resistor 131 from the NPN transistor 130 has a value represented by equation (E2−Ve)/R131. This current is supplied through the current mirror circuit formed of the PNP transistor 132 and the PNP transistor 133 to the base terminal of the NPN transistor 117, and in conjunction with the constant current I2, forms a discharge current for discharging the oscillation capacitor 110. In this case, the discharge period, that is, the lowering period Td1 of the oscillation voltage Vt is represented by the following equation (23) and becomes shorter as the voltage obtained by subtracting the voltage Ve from the second setting voltage E2: (E2−Ve) becomes larger.

$$Td1=C\cdot Vd/\{I2+(E2-Ve)/R131\} \quad (23)$$

Secondly, in the case where the voltage Ve is equal to the second setting voltage E2 or more and is equal to the first setting voltage or less (E2≦Ve≦E1), both the NPN transistor 130 and the PNP transistor 134 turn to OFF state. Therefore, the current for discharging the oscillation capacitor 110 is I2 only. In this case, the discharge period, that is, the lowering period Td2 of the oscillation voltage Vt is represented by the following equation (24) and becomes independent of the error voltage Ve.

$$Td2 = C \cdot Vd/I2 \qquad (24)$$

Furthermore, as shown in FIG. 5(c), in the case where the error voltage Ve is higher than the first setting voltage E1: (Ve>E1), the voltage represented by the equation (Ve−(E2+Vd)) is applied to the resistor 135. Since the sum of the second setting voltage E2 and the voltage Vd is equal to the first setting voltage E1: (E2+Vd=E1), when it is assumed that the value of resistance of the resistor 135 is R135, the current flowing through the resistor 135 from the PNP transistor 134 has a value represented by the equation (Ve−E1)/R135. This current is supplied to the base terminal of the transistor 117, and in conjunction with the constant current I2, forms the current for discharging the oscillation capacitor 110. In this case, the discharge period, that is, the lowering period Td3 of the oscillation voltage Vt is represented by the following equation (25) and becomes shorter as the voltage obtained by subtracting the first setting voltage E1 from the voltage (Ve−E1) becomes larger.

$$Td3 = C \cdot Vd/\{I2+(Ve-E1)/R135\} \qquad (25)$$

Operation of the pulse width control circuit 12 is similar to that of the first embodiment, and the first switch 2 turns to OFF state only in the period when the voltage Ve is smaller than the oscillation voltage Vt: (Ve<Vt) in the rising period of the oscillation voltage Vt. Further, the second switch 5 turns to ON state only in the period when the voltage Ve is larger than the oscillation voltage Vt: (Ve>Vt) in the rising period of the oscillation voltage Vt.

in the case where the direct current input voltage Ei is higher than the direct current output voltage and the error voltage Ve is lower than the oscillation voltage Vt as shown in FIG. 5(a), the output Vy of the comparator 120 is "L" at all times, and therefore, the driving voltage Vg5 is "L" at all times and the second switch 5 is in the OFF state at all times. On the other hand, the output V121 of the OR circuit 121 as an inverted voltage of the driving voltage Vg2 turns to "L" in the rising period of the oscillation voltage Vt, and turns to "H" in the lowering period of the oscillation voltage Vt. Therefore, the first switch 2 turns to OFF state in the rising period Tc of the oscillation voltage Vt and turns to ON state in the lowering period Td1. Hence, the DC—DC converter in accordance with the second embodiment enters the voltage step-down mode wherein the first switch 2 carries out the ON and OFF operation in the ON period δ1·T(=Td1) and the OFF period (1−δ1)T(=Tc). At this time, the lowering period Td1 as the ON period of the first switch 2 becomes shorter as the error voltage Ve becomes lower as mentioned above. As the direct current input voltage Ei becomes higher, the error voltage Ve lowers and the ON period δ1·T of the first switch 2 becomes shorter, whereby the direct current output voltage Eo can be controlled so as to be stabilized.

In the case where the direct current input voltage Ei is close to the direct current output voltage Eo and the waveform of the error voltage Ve crosses that of the oscillation voltage Vt as shown in FIG. 5(b), the second switch 5 turns to ON state only when the voltage Ve is larger than the oscillation voltage Vt: (Ve>Vt) in the rising period Tc of the oscillation voltage Vt. Furthermore, The first switch 2 turns to OFF state only when the voltage Ve is smaller than the oscillation voltage Vt: (Ve<Vt) in the rising period Tc of the oscillation voltage Vt. The period during which the voltage Ve is larger than the oscillation voltage Vt: (Ve>Vt) in the rising period Tc of the oscillation voltage Vt is represented by the following equation (26).

$$Tc(Ve-E2)/(E1-E2) = Tc(Ve-E2)/Vd \qquad (26)$$

Furthermore, the period during which the voltage Ve is smaller than the oscillation voltage Vt: (Ve<Vt) is represented by the following equation (27).

$$Tc(E1-Ve)/(E1-E2) = Tc(E1-Ve)/Vd \qquad (27)$$

Therefore, the above-mentioned operation of the DC—DC converter in accordance with the second embodiment is the voltage step-up and step-down mode wherein the first switch 2 carries out the ON and OFF operation in the ON period δ1·T and the OFF period (1−δ1)T represented by the following equations (28) and (29), respectively, and the second switch 5 carries out the ON and OFF operation in the ON period δ2·T and the OFF period (1−δ2)T represented by the following equations (30) and (31), respectively.

$$\delta1 \cdot T = Td2 + Tc(Ve-E2)/Vd \qquad (28)$$

$$(1-\delta1)T = Tc(E1-Ve)/Vd \qquad (29)$$

$$\delta2 \cdot T = Tc(Ve-E2)/Vd \qquad (30)$$

$$(1-\delta2)T = Td2 + Tc(E1-Ve)/Vd \qquad (31)$$

The switching cycle T is the sum of the rising period Tc and the lowering period td2: (T=Tc+Td2) and becomes constant. As the direct current input voltage Ei becomes higher, the error voltage Ve becomes lower. By shortening the ON period δ1·T of the first switch 2 and the ON period δ2·T of the second switch 5, the direct current output voltage Eo can be controlled so as to stabilize.

As shown in FIG. 5(c), in the case where the direct current input voltage Ei is low and the error voltage Ve is higher than the oscillation voltage Vt, the output V121 of the OR circuit 121 is "H" at all times and the first switch 2 becomes in the ON state at all times. On the other hand, since the driving voltage Vg5 turns to "H" in the rising period of the oscillation voltage Vt and turns to "L" in the lowering period of the oscillation voltage Vt, the second switch 5 turns to ON state in the rising period Tc of the oscillation voltage Vt and turns to OFF state in the lowering period Td3. Therefore, the above-mentioned operation of the DC—DC converter in accordance with the second embodiment is the voltage step-up mode wherein the second switch 2 carries out the ON and OFF operation in the ON period δ2·T(=Tc) and the OFF period (1−δ2)T(=Td3). The ON period δ2·T(=Tc) of the second switch 5 is constant, while the OFF period (1−δ2)T(=Td3) becomes shorter as the error voltage Ve rises as mentioned above. As the direct current input voltage Ei becomes lower, the error voltage Ve rises. By shortening the OFF period (1−δ2)T of the second switch 2, the direct current output voltage Eo can be controlled so as to stabilize.

As described above, also in the DC—DC converter in accordance with the second embodiment, by transmitting two driving signals for carrying out the ON and OFF operation of the first switch and the second switch, based on the comparison between one oscillation voltage waveform and one error voltage, the voltage step-down operation, voltage step-up and step-down operation and voltage step-up operation can be controlled.

In the DC—DC converter in accordance with the second embodiment, frequency variation-typed control is carried out. In other words, the switching frequency becomes higher as the direct current input voltage Ei is higher than the direct current output voltage Eo in the voltage step-down operation mode, while the switching frequency becomes higher as the direct current input voltage Ei is lower than the direct current output voltage Eo in the voltage step-up operation mode. In the voltage step-up and step-down operation mode wherein the two switches carry out the ON and OFF operation, the switching frequency becomes lowest. By carrying out the frequency variation-typed control, the switching loss in the voltage step-up and step-down operation mode, which increases in the case of the fixed frequency-typed control, can be reduced.

Although the DC—DC converter in accordance with the second embodiment is controlled by changing the lowering period of the oscillation voltage Vt by the error voltage Ve, likewise the DC—DC converter in accordance with the first embodiment, it may be also controlled by changing the rising period of the oscillation voltage Vt by the error voltage Ve.

THIRD EMBODIMENT

Figure 6:
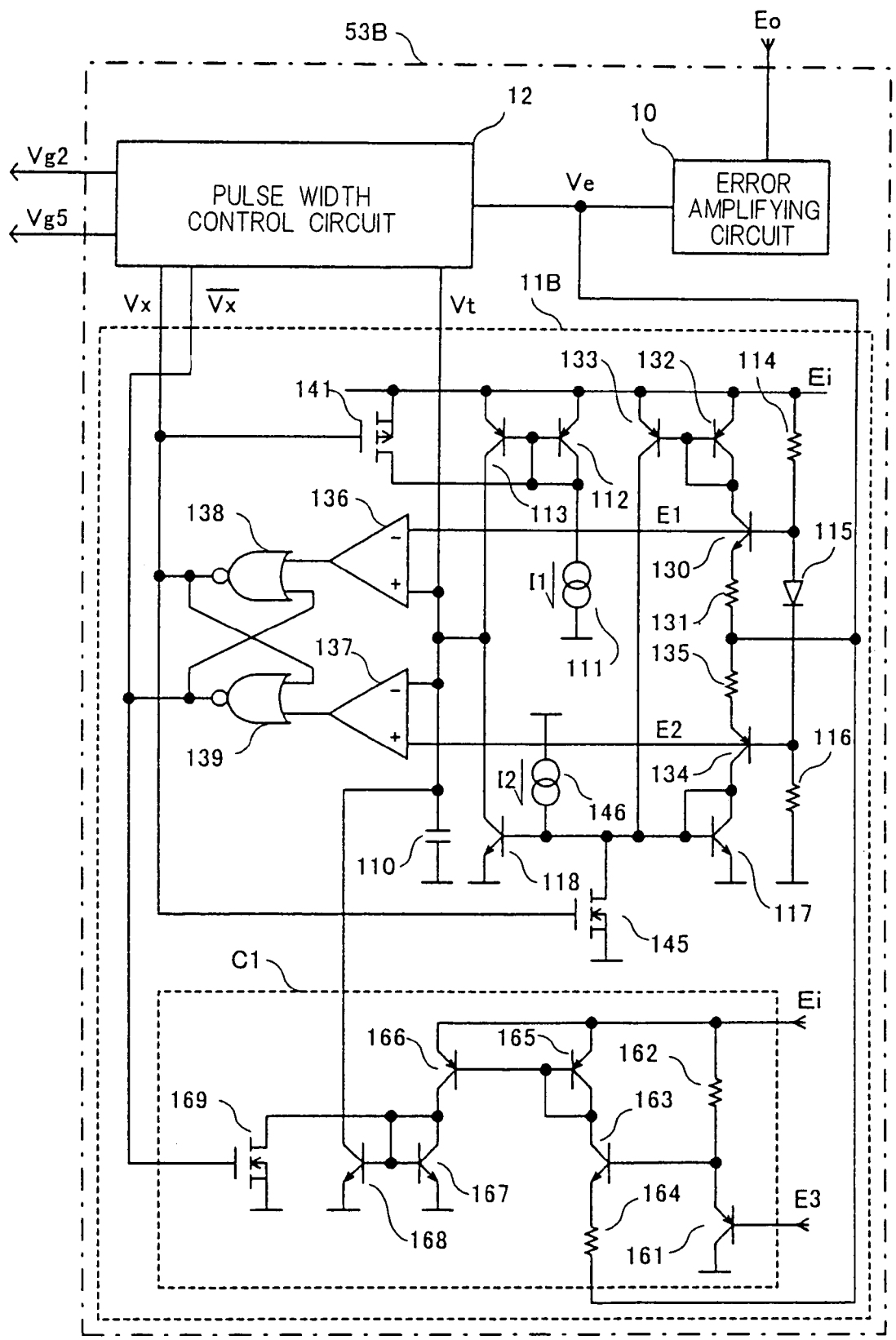
FIG. 6 is a circuit diagram of a control section of a DC—DC converter in accordance with a third embodiment of the present invention.

FIG. 6 is a block diagram and a circuit diagram of a control section 53B of a DC—DC converter in accordance with a third embodiment of the present invention. The DC—DC converter in accordance with the third embodiment is configured by replacing the control section 53 of the converter section 50 shown in FIG. 1 with the above-mentioned control section 53B. In FIG. 6, the error amplifying circuit 10 and the pulse width control circuit 12 are the same as those in FIG. 2 or FIG. 4, and therefore they are illustrated in block diagram. The same reference numerals are applied to elements in an oscillation circuit 11B having the same function and configuration as those of the oscillation circuit 11A shown in FIG. 4 and description thereof are omitted. The control section 53B of the DC—DC converter in accordance with the third embodiment is different from the control section 53A of the DC—DC converter in accordance with the second embodiment shown in FIG. 4 in that, in the oscillation circuit 11B, a circuit C1 is added to the above-mentioned oscillation circuit 11A in FIG. 4. The configuration of the circuit C1 will be described below.

In the circuit C1, a third setting voltage E3 lower than the second setting voltage E2 is applied to the base of a PNP transistor 161. The direct current input voltage Ei of the direct current power source 1 is applied to the emitter of the transistor 161 via a resistor 162. The emitter of the transistor 161 is connected to the base of an NPN transistor 163 and the error voltage Ve is applied to the emitter of the transistor 163 from the error amplifying circuit 10 via a resistor 164. The direct current input voltage Ei is applied to the collector of the transistor 163 via a PNP transistor 165. The transistors 165 and 166 form a current mirror circuit and commonly connected base terminals thereof are connected to the collector of the transistor 165. The emitter of the transistor 166 is connected to the collector terminal and the base terminal of an NPN transistor 167. The transistor 167 and an NPN transistor 168 form a current mirror circuit. The collector terminal of the transistor 168 is connected to the oscillation capacitor 110, and the oscillation capacitor 110 is discharged via the transistor 168. The gate terminal is connected to the output terminal of the NOR circuit 139, and the N-channel MOSFET 169 which is driven by the output of the NOR circuit 139 is connected across the bases and emitters of the transistor 167 and the transistor 168.

Operation of the DC—DC converter in accordance with the third embodiment configured above will be described referring, to FIG. 1 and FIG. 6. In the case where the error voltage Ve is equal to the third setting voltage E3 or more, the operation is similar to that of the above-mentioned DC—DC converter in accordance with the second embodiment. Description is made as to the case where the load 8 is light, the output current is small and the error voltage Ve is lower than the third setting voltage E3.

In a switching converter such as a voltage step-up and step-down DC—DC converter, wherein magnetic energy is repeatedly stored to and released from an inductor, in the case where the output current is larger than a certain value, the current flowing through the inductor does not become zero. Such operation is referred to as a "current continuous mode". For example, the input and output voltage relationship represented by the equation (Eo=$\delta$1·Ei) in the voltage step-down operation mode is established in the current continuous mode. In the voltage step-down operation mode, when the output current become smaller, the current flowing through the inductor decreases in the OFF period of the first switch 2 and becomes zero soon, and the first rectifying section 3 turns to OFF state. The operation having a period during which the current flowing through the inductor becomes zero as mentioned above is referred to as a "current discontinuous mode". In the current discontinuous mode, the equation (Eo=$\delta$1·Ei) that represents the input and output voltage relationship is not established. In order to stabilize the direct current output voltage Eo, the ON period ($\delta$1·T) of the first switch 2 must be made shorter as the output current becomes smaller. The DC—DC converter in accordance with the third embodiment of the present invention carries out the operation of lowering the error voltage Ve. This is the same with respect to the voltage step-up operation mode and the voltage step-up and step-down operation mode.

Power loss which is generated in the switching converter in the case of a small output current is mainly a switching loss generated in turn-on of the switches. To reduce this switching loss thereby to improve the efficiency of the switching converter, the switching frequency should be lowered in the case of a small output current.

The above-mentioned DC—DC converter in accordance with the second embodiment operates in the voltage step-up operation mode or in the voltage step-up and step-down operation mode when the direct current input voltage Ei becomes lower than the direct current output voltage Eo. When the output current becomes small and the operation enters the current discontinuous mode in this state, the error voltage Ve lowers, but the voltage step-up and step-down operation mode which is set at a low switching frequency is maintained. However, when the direct current input voltage Ei is higher than the direct current output voltage Eo, the output current becomes small and the operation enters the current discontinuous mode, the error voltage Ve lowers in the voltage step-down operation mode. At this time, the switching frequency becomes high, thereby to cause a problem of lowering the efficiency.

The DC—DC converter having the control section 53B in accordance with the third embodiment shown in FIG. 6 is characterized in that the switching frequency is lowered as the error voltage Ve becomes low, especially, in a light load of the voltage step-down operation mode. The operation will be described below.

The transistor 161 of which the third setting voltage E3 is applied to the base terminal fixes the voltage of the base terminal of the transistor 163 at the voltage obtained by adding the emitter-base voltage Vd to the third setting voltage E3: (E3+Vd). When the error voltage Ve lowers and becomes lower than the third setting voltage E3, the voltage Vd arises as a voltage across the base and the emitter of the transistor 163, and the transistor 163 to which the base current is supplied via the resistor 162 turns to conducting state. Therefore, the voltage at the emitter terminal of the transistor 163 becomes nearly equal to the third setting voltage E3. The voltage which is a difference between the third setting voltage E3 and the error voltage Ve: (E3−Ve) is applied to the resistor 164. When it is assumed that the resistance value of the resistor 164 is R164, the current I4 flowing to the resistor 164 through the transistor 163 is represented by the following equation (32).

$$I4=(E3-Ve)/R164 \quad (32)$$

This current I4 is the discharge current of the oscillation capacitor 110 flowing through the current mirror circuit formed of the transistor 165 and the transistor 166 and the current mirror circuit formed of the transistor 167 and the transistor 168. The FET 169 turns ON when the output of the NOR circuit 139 is "H", thereby the current mirror circuit formed of the transistor 167 and the transistor 168 turns to OFF state. In other words, the transistor 168 turns to ON state and the discharge current I4 flows in the rising period of the oscillation voltage Vt during which the output of the NOR circuit 139 turns to "L". The discharge current I4 is set so as to be smaller than the charge current I1 from the transistor 113. The charge current in the rising period of the oscillation voltage Vt is the difference between the charge current I1 and the discharge current I4: (I1−I4).

The discharge current I4 becomes larger as the error voltage Ve becomes lower than the third setting voltage E3. Therefore, the charge current in the rising period of the oscillation voltage Vt becomes smaller as the error voltage Ve becomes lower than the third setting voltage E3. For that reason, the rising period of the oscillation voltage Vt, that is, the OFF period of the first switch 2 in the voltage step-down operation mode becomes longer as the error voltage Ve becomes lower than the third setting voltage E3, and as a result the switching frequency lowers.

As mentioned above, in the DC—DC converter in accordance with the third embodiment of the present invention, in addition to the above-mentioned feature described in the second embodiment, in the case where the load is light and the output current is small in the voltage step-down operation mode, since the switching frequency lowers as the error voltage Ve lowers, the switching loss is reduced, and it is possible to obtain an effect of improving the efficiency.

FOURTH EMBODIMENT

Figure 7:
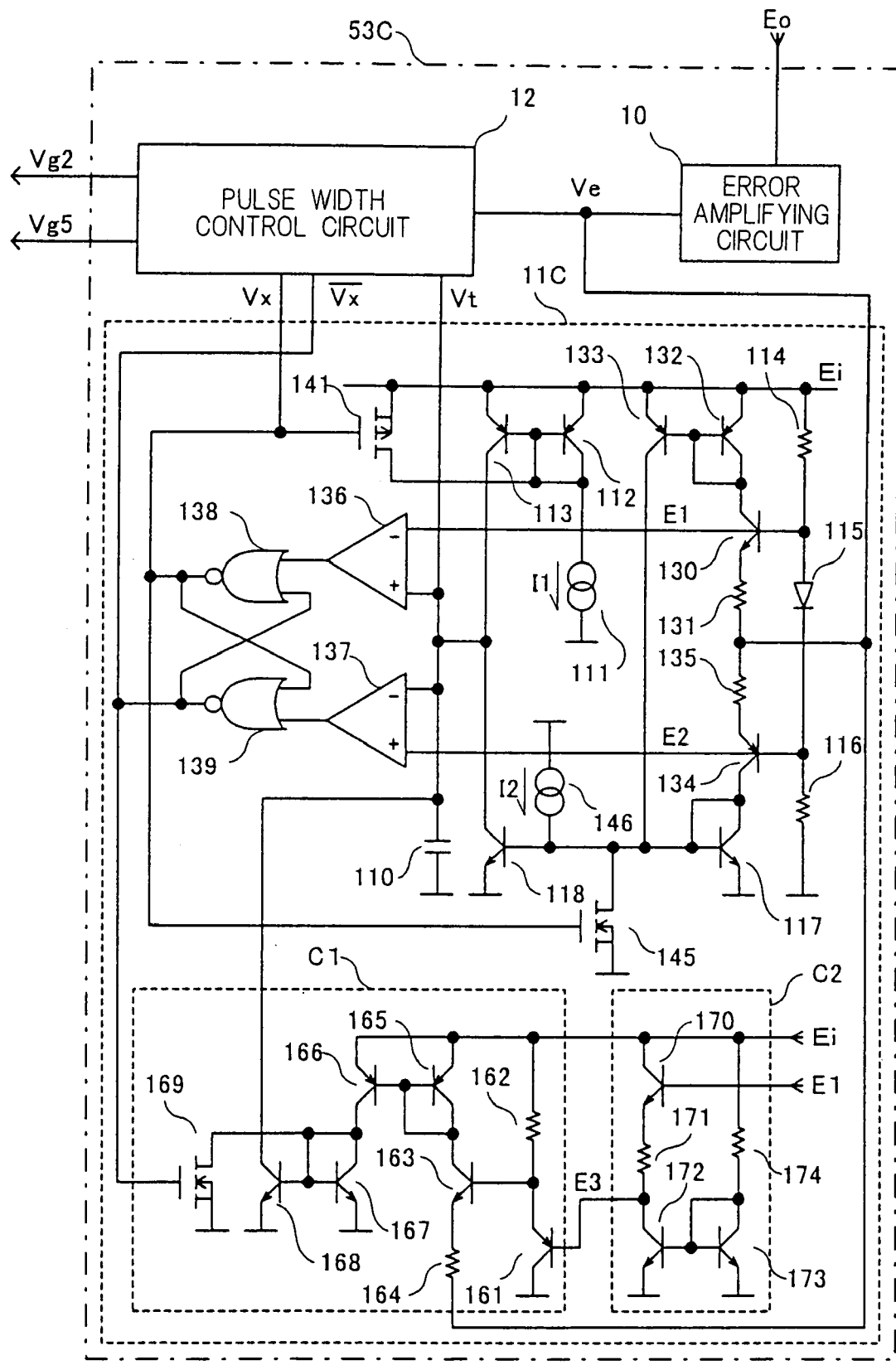
FIG. 7 is a circuit diagram of a control section of a DC—DC converter in accordance with a fourth embodiment of the present invention.

FIG. 7 is a circuit diagram of a control section 53C of a DC—DC converter in accordance with a fourth embodiment of the present invention. The DC—DC converter in accordance with the fourth embodiment is configured by replacing the control section 53 of the converter section 50 shown in FIG. 1 with the above-mentioned control section 53C. In FIG. 7, the same reference numerals are applied to elements having the same function and configuration as those of the control section 53B of the DC—DC converter in accordance with the third embodiment shown in FIG. 6 and description thereof are omitted. The control section 53C of the DC—DC converter in accordance with the fourth embodiment is different from the control section 53B of the DC—DC converter in accordance with the third embodiment shown in FIG. 6 in that a circuit C2 is added to the above-mentioned oscillation circuit 11B of FIG. 6 for the oscillation circuit 11C. The configuration of the circuit C2 will be described below.

The base terminal of an NPN transistor 170, which is connected to the direct current power source 1 of the input voltage Ei at the collection terminal is connected to the junction of the resistor 114 and the diode 115. The emitter terminal of the transistor 170 is connected to the base of the transistor 161 and the collector terminal of an NPN transistor 172 via a resistor 171. A transistor 172 and an NPN transistor 173 form a current mirror circuit, and the collector terminal of the transistor 173 is connected to base terminal thereof and also connected to the direct current power source 1 via a resistor 174.

When the value of resistance of the resistor 114 is made equal to that of the resistor 116, the first setting voltage E1 and the second setting voltage E2 are represented by the equations (33) and (34), respectively.

$$E1=(Ei+Vd)/2 \quad (33)$$

$$E2=(Ei-Vd)/2 \quad (34)$$

As described in the second embodiment, the ON period δ1·T and the OFF period (1−δ1)T of the first switch 2 in the current continuous mode are represented by the following equations (35) and (36), respectively.

$$\delta1 \cdot T = Td1 = C \cdot Vd/\{I2+(E2-Ve)/R131\} \quad (35)$$

$$(1-\delta1)T=Tc=C \cdot Vd/I1 \quad (36)$$

Since the duty ratio δ1 is equal to the ratio of the direct current output voltage Eo and the direct current input voltage Ei: (Eo/Ei), the error voltage Ve is obtained as represented by an equation (37) by arranging each of the above-mentioned equations.

$$Ve=E2-R131 \cdot \{(Ei/Eo) \cdot I1-I1-I2\} \quad (37)$$

In the DC—DC converter in accordance with the fourth embodiment, the second setting voltage E2 has input-voltage dependency because the second setting voltage E2 is obtained from the direct current input voltage Ei. Therefore, it is impossible to know the input-voltage dependency of the error voltage Ve. However, during the operation of stabilizing the direct current output voltage Eo, the error voltage Ve in the voltage step-down operation mode and the current continuous mode becomes close to the second setting voltage E2 as the direct current input voltage Ei becomes high. When the load becomes light and the operation enters the current discontinuous mode, the error voltage Ve is lower than the value given by the equation (37). In other words, when the third setting voltage E3 is a fixed value, the load that begins lowering of the switching frequency becomes small as the direct current input voltage E1 becomes low. In a range in which the switching frequency does not lower, only the ON periods of the first switch 2 and the second switch 5 are made small, whereby the switching frequency remains high. Hence, it is found that input dependency should be provided so that the third setting voltage E3 becomes high as the direct current input voltage becomes low, by setting the third setting voltage E3 at a value slightly lower than the value obtained by the equation (32) in the second embodiment.

In the oscillation circuit 11C of the DC—DC converter shown in FIG. 7, description is made as to a circuit C2 for obtaining the third setting voltage E3. When it is assumed that the resistance value of the resistor 174 is R174, the current I5 flowing to the transistor 173 through the resistor 174 is represented by the following equation (38).

$$I5=(Ei-Vd)/R174 \qquad (38)$$

Since this current I5 flows to the resistor 171 through the transistor 172 of the current mirror circuit, when it is assumed that the resistance value of the resistor 171 is R171, voltage drop thereof is represented by the following equation (39).

$$(R171/R174)\cdot(Ei-Vd) \qquad (39)$$

On the other hand, since the emitter terminal of the transistor 170 connected to the resistor 171 has a value obtained by subtracting the base-emitter voltage Vd of the transistor 170 from the first setting voltage E1: (E1−Vd), it becomes equal to the second setting voltage E2 as represented by the following equation (40).

$$E1-Vd=E2 \qquad (40)$$

Therefore, the third setting voltage E3 is represented by the following equation (41).

$$E3=E2-(R171/R174)\cdot(Ei-Vd) \qquad (41)$$

Where, the resistance ratio R171/R174 is set to be equal to the voltage ratio R131·I1/Eo, and the voltage (R171/R174)·Vd is set to be slightly smaller than the voltage R131·(I1+I2). Consequently, the third setting voltage E3 is set at a value slightly lower than the value represented by the equation (37) of the error voltage Ve in the voltage step-down operation mode and the current continuous mode.

The DC—DC converter in accordance with the fourth embodiment has also the features in the third embodiment in addition to the features of in the second embodiment. That is, in the case where the load is light and the output current is small in the voltage step-down operation mode, the switching frequency lowers as the error voltage Ve lowers. Then switching loss decreases, whereby the efficiency can be improved. Furthermore, by changing the third setting voltage in response to the direct current input voltage Ei, the output current that begins lowering of the switching frequency can be prevented from depending on the change of the direct current input voltage Ei, and be set at the value slightly smaller than the output current in the current discontinuous mode.

FIFTH EMBODIMENT

In the above-mentioned first embodiment and the second embodiment, the error voltage Ve is compared with the first setting voltage E1 and the second setting voltage E2, and the operation mode is changed at each coincidence point. For example, in the case where the error voltage Ve is between the first setting voltage E1 and the second setting voltage E2, and where the error voltage Ve rises and reaches the first setting voltage E1 as the direct current input voltage Ei lowers, the voltage step-up and step-down operation mode is switched to the voltage step-up operation mode. When it is assumed that, with this switching of the operation mode, the number of switches that carry out the ON and OFF operation decreases and the power consumption of the DC—DC converter is reduced slightly, the direct current output voltage Eo rises in accordance with the reduction. Consequently, the error voltage Ve lowers so that the raised direct current output voltage Eo is made equal to a desired value. In the case where the lowered error voltage Ve returns to the first setting voltage E1, the voltage step-up operation mode is switched to the voltage step-up and step-down operation mode. At this time, the power consumption of the DC—DC converter increases slightly, the direct current output voltage Eo lowers in accordance with the increase, and the error voltage Ve rises, whereby the voltage step-up and step-down operation mode is switched to the voltage step-up operation mode again. When the above-mentioned operation is repeated, the operation mode is not stable, and it is conceivable of the occurrence of harmful influences such as increase in output ripple voltage and occurrence of noise. As a means to prevent such phenomena, it is desirable that the operation of comparing the error voltage Ve with the first setting voltage E1 have a hysteresis. This is similar with respect to the operation of comparing the error voltage Ve with the second setting voltage E2.

Figure 8:
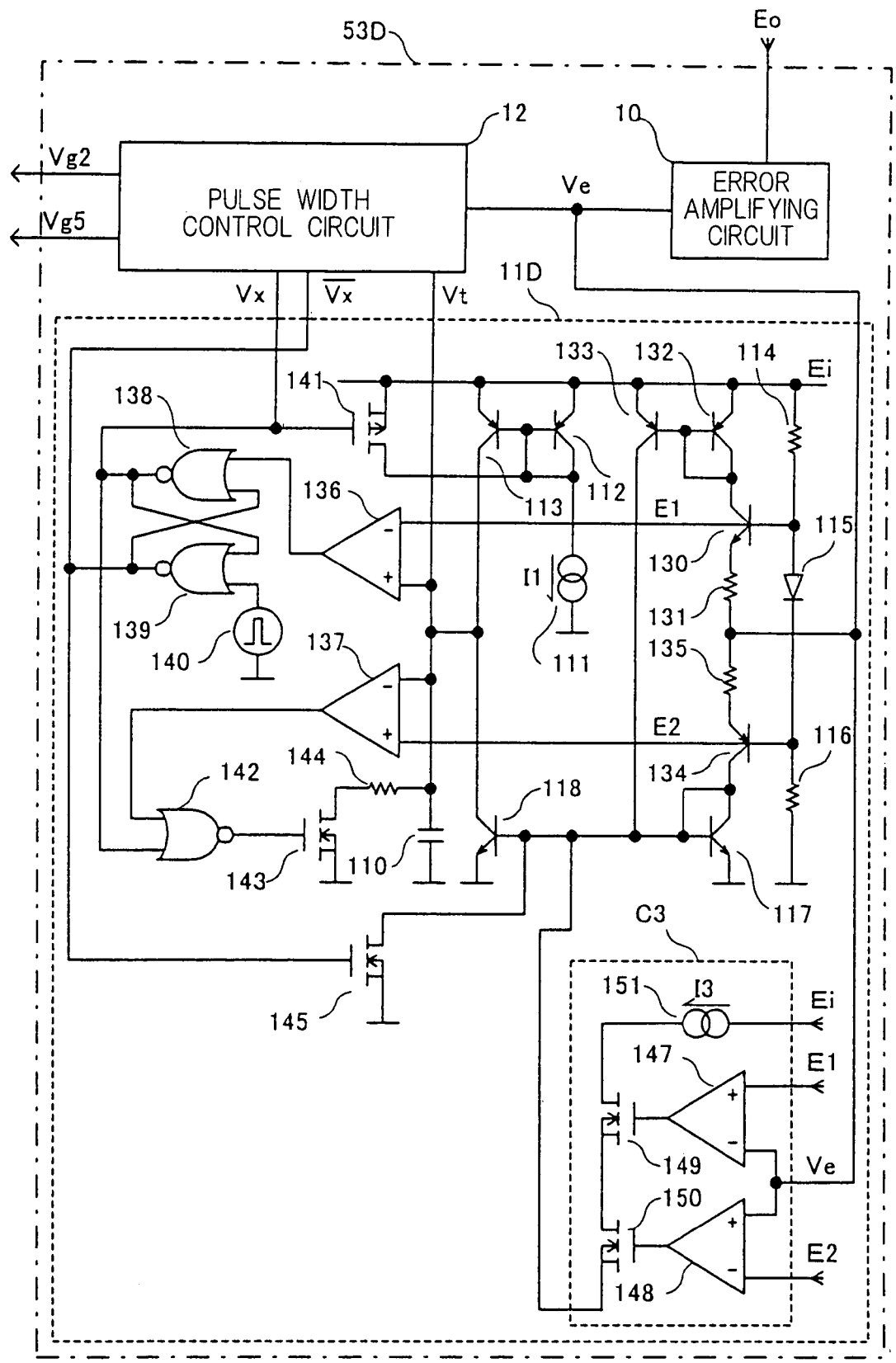
FIG. 8 is a circuit diagram of a control section of a DC—DC converter in accordance with a fifth embodiment of the present invention.

FIG. 8 is a circuit diagram showing the configuration of an oscillation circuit 11D of a control section 53D of a DC—DC converter in accordance with a fifth embodiment of the present invention. The DC—DC converter in accordance with the fifth embodiment is configured by replacing the control section 53 of the converter section 50 shown in FIG. 1 with the above-mentioned control section 53D. The DC—DC converter in accordance with the fifth embodiment is different from the control section 53 of the DC—DC converter in accordance with the first embodiment shown in FIG. 2 in the oscillation circuit 11D. Fundamental configuration and operation other than the oscillation circuit 11D is the same. In the oscillation circuit 11D shown in FIG. 8, the same reference numerals are applied to elements having the same function and configuration as those of the oscillation circuit 11 shown in FIG. 2 and descriptions thereof are omitted.

In the oscillation circuit 11D which is a different part from the configuration of the control section 53 of the DC—DC converter of the first embodiment shown in FIG. 2 in the control section 53D of FIG. 8, a circuit C3 is further added to the configuration of the oscillation circuit 11 shown in FIG. 2. The configuration of the circuit C3 will be described below.

A comparator 147 compares the first setting voltage E1 with the error voltage Ve, and a comparator 148 compares the second setting voltage E2 with the error voltage Ve. An N-Channel MOSFET 149 receives the output of the comparator 147 at the gate terminal thereof and turns to ON state, when the first setting voltage E1 is larger than the error voltage Ve: (E1>Ve) and the output of the comparator 147 turns to "H". Furthermore, a N-Channel MOSFET 170 receives the output of the comparator 148 at the gate terminal thereof and turns to ON state, when the second setting voltage E2 is smaller than the error voltage Ve: (E2<Ve) and the output of the comparator 148 turns to "H". Further, the oscillation circuit 11D of the fifth embodiment is provided with a constant current power source 151 and supplies the constant current I3 to the base terminal of the NPN transistor 118 through an FET 149 and an FET 170.

In the oscillation circuit 11D of the DC—DC converter in accordance with the fifth embodiment configured as mentioned above, when the error voltage Ve is between the first setting voltage E1 and the second setting voltage E2, that is, in the voltage step-up and step-down operation mode, both the FET 149 and the FET 170 turn to ON state and the constant current I3 is supplied to the base terminal of the NPN transistor 118. Since the NPN transistor 118 and the NPN transistor 117 form a current mirror circuit, this constant currant I3 is added to the discharge current of the oscillation capacitor 110. During this period, the oscillation capacitor 110 is in the charge period during which the oscillation voltage Vt is in the rising period, and the charge current is a current obtained by subtracting the current I3 of the constant current source 151 from the current I1 of the constant current source 111: (I1−I3).

Next, when the error voltage Ve rises and reaches the first setting voltage E1 as the direct current input voltage Ei lowers, the operation in the case where the voltage step-up and step-down operation mode is switched to the voltage step-up operation mode is described.

In the voltage step-up and step-down operation mode as mentioned above, since the charge current of the oscillation capacitor 110 is the current (I1−I3), the rising period Tc of the oscillation voltage Vt is represented by the following equation (42).

$$Tc = C \cdot Vd / (I1 - I3) \tag{42}$$

When the error voltage Ve approaches the first setting voltage E1 in this state, the OFF time of the first switch 2 becomes approximately zero and the ON time of the second switch 5 becomes close to the rising period Tc.

When the error voltage Ve reaches the first setting voltage E1, the output of the comparator 147 is inverted to "L". For that reason, the FET 149 turns to OFF state, and the current I3 from the constant current source 151 does not flow, and at the same time, the first switch 2 turns to ON state at all times, and the operation enters the voltage step-up operation mode. At this time, the ON time of the second switch 5 is changed from the value represented by the equation $C \cdot Vd/(I1-I3)$ to the value represented by the equation $C \cdot Vd/I1$ and becomes short. Since this is in the direction which lowers the direct current output voltage Eo, the error voltage Ve rises further and the operation in the voltage step-up operation mode is established.

Next, when the error voltage Ve lowers and reaches the second setting voltage E2 as the direct current input voltage Ei rises, the operation in the case where the voltage step-up and step-down operation mode is switched to the voltage step-down operation mode is described.

During operation in the voltage step-up and step-down operation mode, the rising period Tc of the oscillation voltage Vt is represented by the following equation (43).

$$Tc = C \cdot Vd / (I1 - I3) \tag{43}$$

When the error voltage Ve approaches the second setting voltage E2 in this state, the OFF time of the first switch 2 approaches the rising period Tc, and the ON time of the second switch 5 becomes approximately zero.

When the error voltage Ve reaches the second setting voltage E2, the output of the comparator 148 is inverted to "L". Hence, the FET 170 turns to OFF state and the current I3 from the constant current source 151 does not flow. At this time, the second switch 5 turns to OFF state at all times and the operation enters the voltage step-down operation mode. At this time, the OFF time of the first switch 2 is changed from the value represented by the equation $C \cdot Vd/(I1-I3)$ to the value represented by the equation $C \cdot Vd/I1$ and becomes short. Since this is in the direction which raises the direct current output voltage Eo, the error voltage Ve lowers further and the operation in the voltage step-down operation mode is established.

As mentioned above, according to the DC—DC converter in accordance with the fifth embodiment, the operation mode can be switched smoothly. It has the effect of carrying out the stable switching operation, especially when the voltage step-up and step-down operation mode is switched to the voltage step-up operation mode. This is an effective measure against phenomenon that occurs as a result of reduction in switching loss caused by decreasing the number of switches for carrying out the ON-OFF operation in switching to the voltage step-up operation mode. In other words, it is possible to prevent the phenomenon wherein the operation mode changes suddenly to become unstable, for example, when the direct current output voltage Eo rises, the error voltage Ve lowers and the operation returns the voltage step-up and step-down operation mode again, and further shifts to the voltage step-up operation mode.

SIXTH EMBODIMENT

The above-mentioned method for switching the operation mode smoothly as described in the fifth embodiment also is applicable to the DC—DC converter in accordance with the second embodiment shown in FIG. 4.

Figure 9:
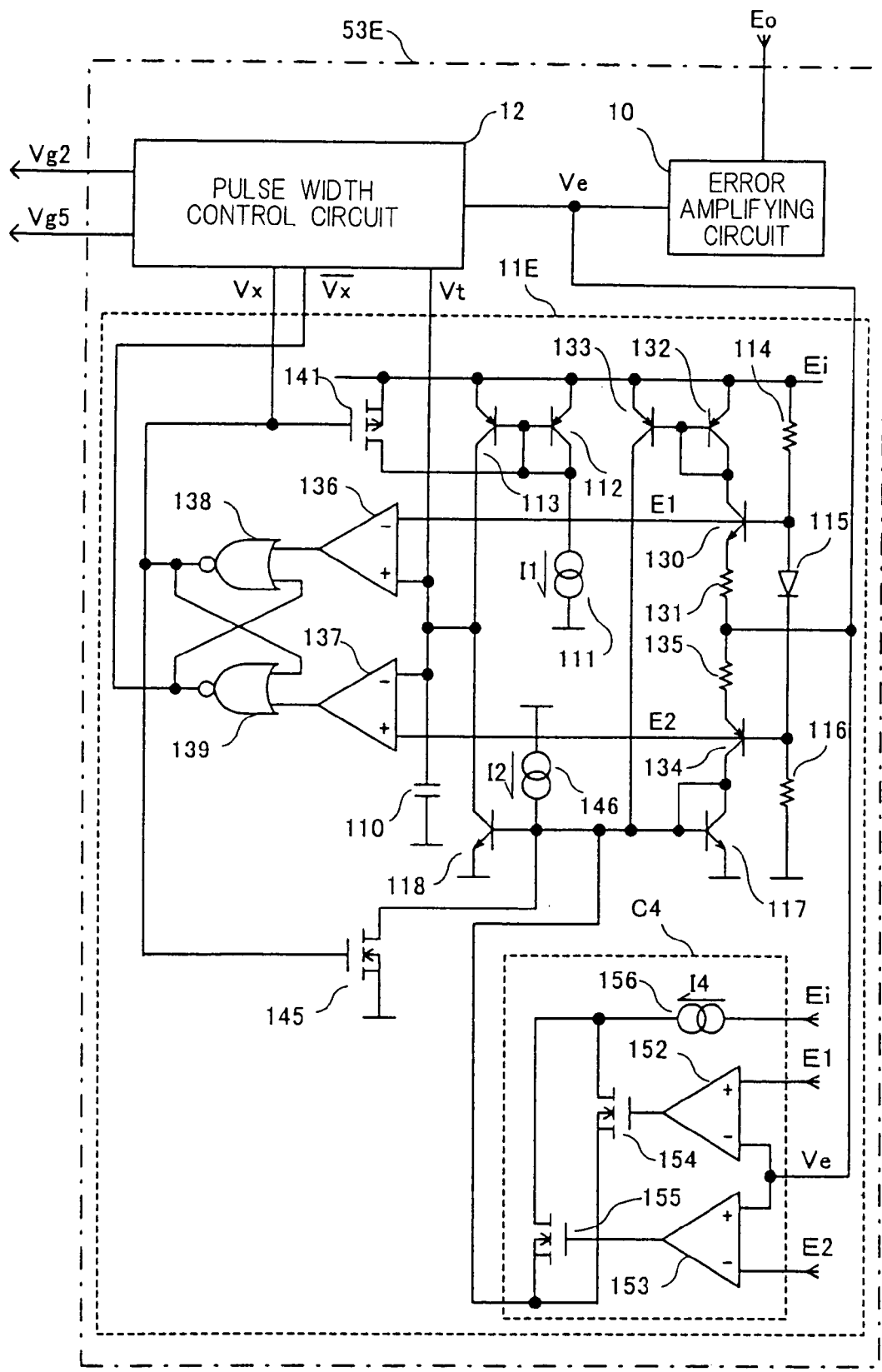
FIG. 9 is a circuit diagram of a control section of a DC—DC converter in accordance with a sixth embodiment of the present invention.
Figure 10:
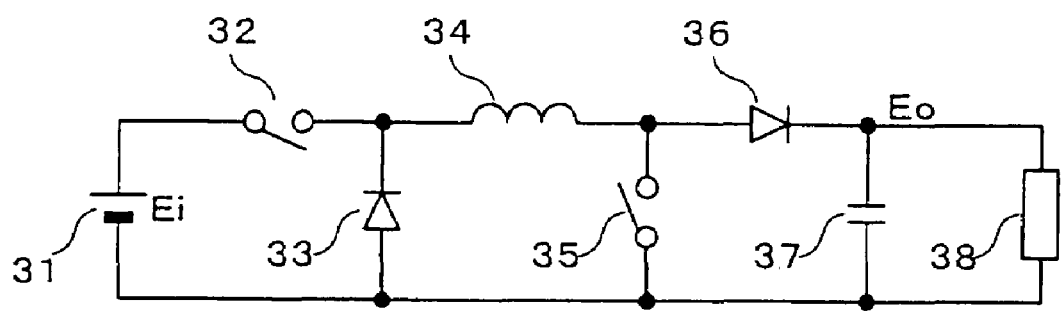
FIG. 10(a) is the circuit diagram showing configuration of the conventional DC—DC converter.
FIG. 10(b) is the waveform diagram showing operations of the conventional DC—DC converter.
Figure 10:
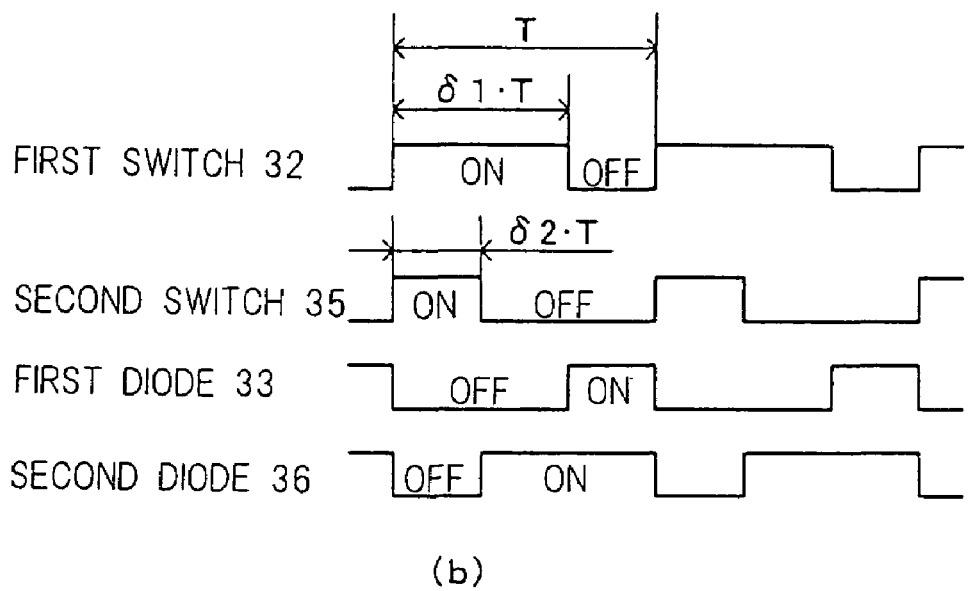
Figure 11:
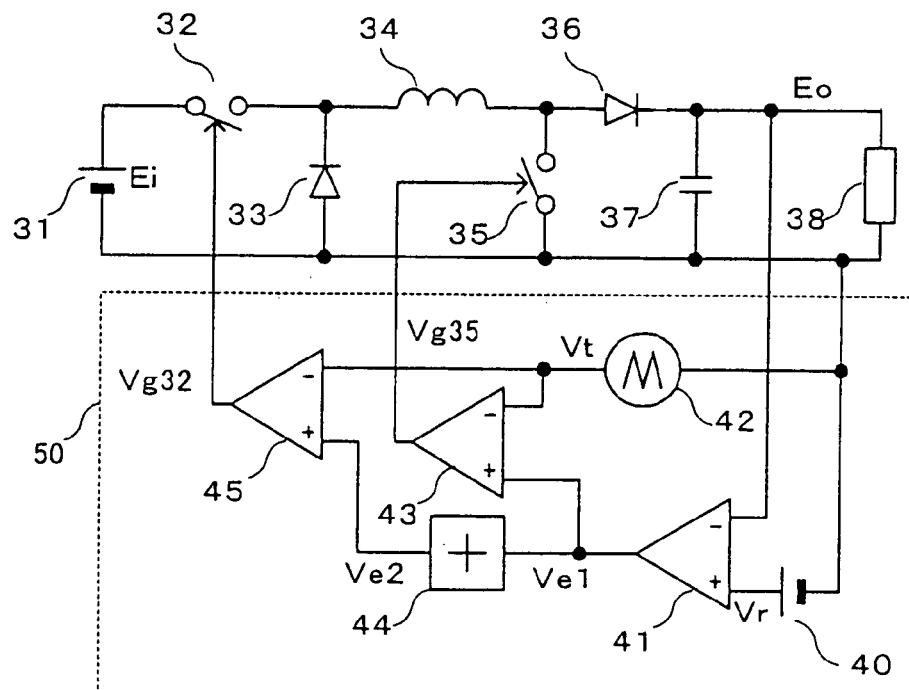
FIG. 11(a) is the circuit diagram showing configuration of the conventional DC—DC converter.
FIG. 11(b) is the waveform diagram showing operations of the conventional DC—DC converter.
Figure 11:
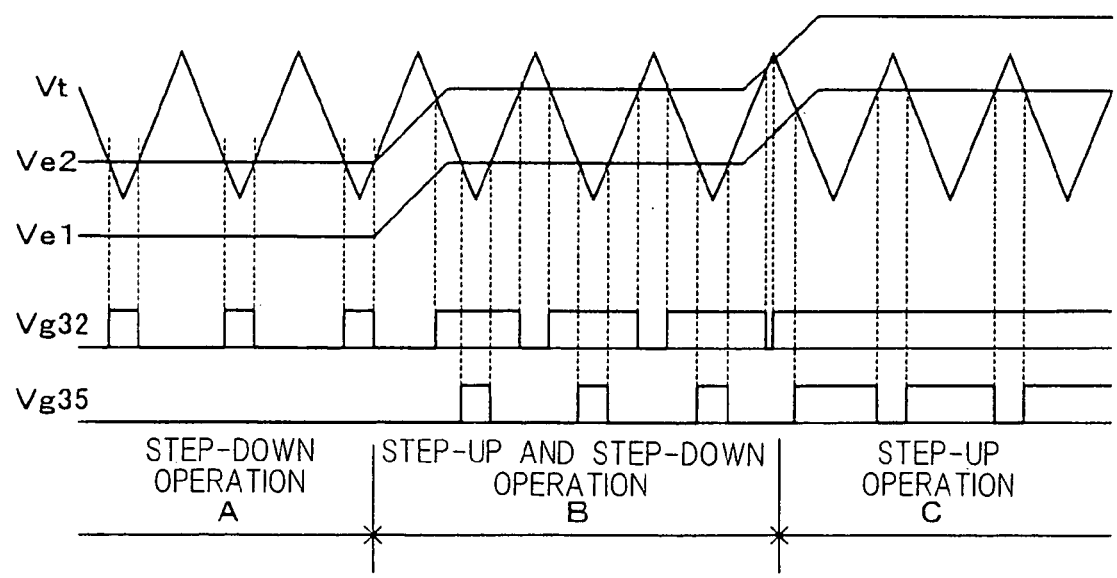

FIG. 9 is a circuit diagram showing the configuration of a control section 53E of a DC—DC converter in accordance with a sixth embodiment of the present invention. The DC—DC converter in accordance with the sixth embodiment is configured by replacing the control section 53 of the converter section 50 shown in FIG. 1 with the above-mentioned control section 53E. In the sixth embodiment, the method for switching the operation mode smoothly as described in the fifth embodiment is applied to the oscillation circuit 11A of the DC—DC converter in accordance with the second embodiment shown in FIG. 4.

Fundamental configuration and operation of the control section 53E including the oscillation circuit 11E of the DC—DC converter shown in FIG. 9 is the same as that of the control section 53 in accordance with the second embodiment shown in FIG. 4, and the same reference numerals are applied to elements having the same function and configuration and descriptions thereof are omitted.

The difference between the control section 53E of the DC—DC converter in accordance with the sixth embodiment shown in FIG. 9 and the control section 53A of the DC—DC converter shown in FIG. 4 is in the oscillation circuit 11E. The oscillation circuit 11E is configured by adding a circuit C4 to the oscillation circuit 11A shown in FIG. 4. The configuration and operation of the circuit C4 will be described below.

A comparator 152 compares the first setting voltage E1 with the error voltage Ve, and a comparator 153 compares the second setting voltage E2 with the error voltage Ve. An N-Channel MOSFET 154, receives the output of the comparator 152 at the gate terminal thereof, and turns to ON state when the first setting voltage E1 is smaller than the error voltage Ve: (E1<Ve), and the output of the comparator 152 turns to "H". An N-Channel MOSFET 155, the gate terminal of which receives the output of the comparator 153, turns to ON state when the second setting voltage E2 is larger than the error voltage Ve: (E2>Ve) and the output of the comparator 153 becomes "H". Furthermore, the control section of the DC—DC converter in FIG. 9 is provided with a constant current source 156, and a constant current I4 is supplied to the base terminal of the NPN transistor 118 via a parallel circuit formed of an FET 154 and an FET 155.

By the configuration as mentioned above, during operation in the voltage step-up operation mode or the voltage step-down operation mode, the constant current I4 is supplied to the base terminal of the NPN transistor 118 and is added to the discharge current of the oscillation capacitor 110.

The period during which the constant current I4 is added to the discharge current of the oscillation capacitor 110 is set to be the lowering period of the oscillation voltage Vt, whereby the DC—DC converter in accordance with the second embodiment has a similar effect to the DC—DC converter in accordance with the first embodiment as described in FIG. 8.

In the above-mentioned first embodiment to sixth embodiment, the rising period may be controlled by changing depending on the error voltage Ve, and the lowering period may be controlled by changing depending on the error voltage Ve.

INDUSTRIAL APPLICABILITY

As clarified by the detailed description of each embodiment, the present invention has the following effects.

In the DC—DC converter of the present invention, control from voltage step-up to voltage step-up and step-down and further to voltage step-down is carried out with two driving signals that are generated by comparing the waveform of one oscillation voltage with one error voltage and perform the ON and OFF operation of the first, and second switches. Hence, it is possible to control the voltage step-down operation mode, the voltage step-up and step-down operation mode and the voltage step-up operation mode, whereby the configuration of the control section can be simplified.

In the voltage step-down operation or the voltage step-up operation, as the difference between input voltage and output voltage becomes large, the switching frequency is made high and the switching frequency is made lower in the voltage step-up and step-down operation. Hence, the switching loss due to the ON and OFF operation of the two switches in the voltage step-up and step-down operation can be reduced.

In the voltage step-down operation in which the switching frequency fluctuates as mentioned above, in the case where the third setting voltage is provided and the error voltage makes the direct current output voltage low beyond the third setting voltage, the switching frequency is made low as the difference between input voltage and output voltage becomes large. Hence, in the case where the load is light and the output current is small, the switching loss can be reduced.

By providing the above-mentioned third setting voltage with direct current voltage dependency, the point at which the operation enters the current discontinuous mode and the switching frequency lowers can be prevented from fluctuating depending on the change of the direct current input voltage.

By changing the rising or lowering speed of the oscillation voltage in the direction of facilitating the shift of operation mode in switching the operation mode, the DC—DC converter of the present invention has the effect that the operation mode can shift smoothly.

The invention claimed is:

1. A DC—DC converter of voltage step-up and step-down type comprising a voltage step-down converter section having a first switch, a voltage step-up converter section having a second switch and a control section for turning ON and OFF said first switch and said second switch, respectively, for receiving a direct current input voltage and outputting a direct current output voltage to a load, wherein said control section comprises:
an error amplifying circuit for comparing said direct current output voltage with a predetermined voltage and for outputting an error voltage,
an oscillation circuit for generating an oscillation voltage cyclically changing between a first setting voltage and a second setting voltage lower than said first setting voltage, a ratio of rising period or a ratio of lowering period per one cycle of said oscillation voltage increasing as the difference between said error voltage and said first setting voltage increases, when said error voltage is higher than said first setting voltage, and the ratio of rising period or the ratio of lowering period per one cycle of said oscillation voltage increasing as the difference between said error voltage and said second setting voltage increases, when said error voltage is lower than said second setting voltage, and
a pulse width control circuit for controlling the ON and OFF periods of said first switch and the ON and OFF periods of said second switch so as to carry out control of a voltage step-down operation mode wherein said second switch is fixed at OFF state and said first switch is turned ON and OFF, or to carry out control of a voltage step-up operation mode wherein said first switch is fixed to ON state and said second switch is turned ON and OFF, in a case where said error voltage is compared with said oscillation voltage and said error voltage does not coincide with said oscillation voltage, and to carry out control of a voltage step-up and step-down operation mode wherein both said first switch and said second switch are turned ON and OFF in a case where said error voltage coincides with said oscillation voltage occasionally.

2. A DC—DC converter in accordance with claim 1, wherein said error amplifying circuit is configured:
to output the error voltage that rises as said direct current output voltage is lower than said predetermined voltage, and lowers as said direct current output voltage is higher than said predetermined voltage,
said oscillation circuit is configured:
to increase the ratio of rising period per one cycle of said oscillation voltage as the difference between said error voltage and said second setting voltage increases when said error voltage is lower than said second setting voltage, and to increase the ratio of rising period per one cycle of said oscillation voltage as the difference between said error voltage and said first setting voltage increases when said error voltage higher than said first setting voltage, and
said pulse width control circuit is configured:
to carry out control in the voltage step-down operation mode wherein said second switch is fixed at OFF state, and said first switch is turned to OFF state in the rising period of said oscillation voltage and turned to ON state in the remaining period, in a case where said error voltage is lower than said second setting voltage, in a case where said error voltage is higher than said first setting voltage, to carry out control in the voltage step-up operation mode wherein said first switch is fixed at ON state, and said second switch is turned to ON state in the rising period of said oscillation voltage and turned to OFF state in the remaining period, and in the case where said error voltage coincides with said oscillation voltage occasionally, to carry out control in the voltage step-up and step-down operation mode wherein said first switch is turned to OFF state in the period during which said error voltage is lower than said oscillation voltage in the rising period of said oscillation voltage and turned to ON state in the remaining period, and said second switch is turned to ON state in the period during which said error voltage is higher than said oscillation voltage in the rising period of said oscillation voltage and turned to OFF state in the remaining period.

3. A DC—DC converter in accordance with claim 2, wherein
said oscillation circuit is configured:
  to have an oscillation capacitor for outputting said oscillation voltage by being charged or discharged in response to a pulse signal having a predetermined cycle, and
  to charge said oscillation capacitor when said pulse signal is input in a state wherein said oscillation voltage is maintained at said second setting voltage, to discharge said oscillation capacitor when said oscillation voltage reaches said first setting voltage, and to maintain said oscillation voltage in the vicinity of said second setting voltage without charging or discharging said oscillation capacitor when said oscillation voltage reaches said second setting voltage.

4. A DC—DC converter in accordance with claim 1, wherein
said oscillation circuit is configured:
  to generate a triangular wave shaped oscillation voltage that rises or lowers cyclically between the first setting voltage and the second setting voltage lower than said first setting voltage, the cycle of said oscillation voltage decreasing as the difference between said error voltage and said first setting voltage increases, when said error voltage is higher than said first setting voltage, and the cycle of said oscillation voltage decreasing as the difference between said error voltage and said second setting voltage increases when said error voltage is lower than said second setting voltage.

5. A DC—DC converter in accordance with claim 4, wherein
said error amplifying circuit is configured:
  to output the error voltage that rises as said direct current output voltage becomes lower than said predetermined voltage, and lowers as said direct current output voltage becomes higher than said predetermined voltage,
said oscillation circuit is configured:
  to increase the ratio of rising period per one cycle of said oscillation voltage as the difference between said error voltage said second setting voltage increases, when said error voltage lower than said second setting voltage and to increase the ratio of rising period per one cycle of said oscillation voltage as the difference between said error voltage and said first setting voltage increases, when said error voltage is higher than said first setting voltage, and
said pulse width control circuit is configured:
  to carry out control in the voltage step-down operation mode wherein said second switch is fixed at OFF state, and said first switch is turned to OFF state in the rising period of said oscillation voltage and turned to ON state in the remaining period in a case where said error voltage is lower than said second setting voltage, in a case where said error voltage is higher than said first setting voltage, to carry out control in the voltage step-up operation mode wherein said first switch is fixed at ON state, and said second switch is turned to ON state in the rising period of said oscillation voltage and turned to OFF state in the remaining period, and in the case where said error voltage coincides with said oscillation voltage occasionally, to carry out control in the voltage step-up and step-down operation mode wherein said first switch is turned to OFF state in the period during which said error voltage is lower than said oscillation voltage in the rising period of said oscillation voltage and turned to ON state in the remaining period, and said second switch is turned to ON state in the period during which said error voltage is higher than said oscillation voltage in the rising period of said oscillation voltage and turned to OFF state in the remaining period.

6. A DC—DC converter in accordance with claim 5, wherein
said oscillation circuit is configured:
  to set the rising speed of said oscillation voltage constant regardless of the change of said error voltage, and to increase the lowering speed of said oscillation voltage as said error voltage is higher than said first setting voltage, and as said error voltage is lower than said second setting voltage, and
said pulse width control circuit is configured:
  in the lowering period of said oscillation voltage, to turn said first switch to ON state and to turn said second switch to OFF state, and in the rising period of said oscillation voltage, to turn both said first switch and said second switch to ON state in a case where said error voltage is higher than said oscillation voltage, and to turn both said first switch and said second switch to OFF state in a case where said error voltage is lower than said oscillation voltage.

7. A DC—DC converter in accordance with claim 4, wherein
said error amplifying circuit is configured:
  to output the error voltage that rises as said direct current output voltage is lower than said predetermined voltage, and lowers as said direct current output voltage is higher than said predetermined voltage,
said oscillation circuit is configured:
  to set the lowering speed of said oscillation voltage constant regardless of the change of said error voltage and
  to increase the rising speed of said oscillation voltage as said error voltage is higher than said first setting voltage, and as said error voltage is lower than said second setting voltage, and
said pulse width control circuit is configured:
  in the rising period of said oscillation voltage, to turn said first switch to ON state and to turn said second switch to OFF state, and
  in the lowering period of said oscillation voltage, to turn both said first switch and said second switch to ON state in a case where said error voltage is higher than said oscillation voltage, and to turn both said first switch and said second switch to OFF state in a case where said error voltage is lower than said oscillation voltage.

8. A DC—DC converter in accordance with claim 4, wherein
said oscillation circuit is configured:
  so as to elongate the cycle of said oscillation voltage as the voltage difference between said error voltage and said third setting voltage becomes large in said voltage step-down operation mode in a case where a predetermined third setting voltage is compared with said error voltage said error voltage exceeds said third setting voltage in the direction of lowering said direct current output voltage.

9. A DC—DC converter in accordance with claim 5, wherein
said oscillation circuit is configured:
with respect to the third setting voltage lower than said second setting voltage, so as to elongate the cycle of said oscillation voltage as the voltage difference between said error voltage and said third setting voltage becomes large in a case where said error voltage is lower than said third setting voltage.

10. A DC—DC converter in accordance with claim 6, wherein
said oscillation circuit is configured:
with respect to the third setting voltage lower than said second setting voltage, so as to slow the lowering speed of said oscillation voltage as the voltage difference between said error voltage and said third setting voltage becomes large in a case where said error voltage is lower than said third setting voltage.

11. A DC—DC converter in accordance with claim 7, wherein
said oscillation circuit is configured:
with respect to the third setting voltage lower than said second setting voltage, so as to slow the rising speed of said oscillation voltage as the voltage difference between said error voltage and said third setting voltage becomes large in a case where said error voltage is lower than said third setting voltage.

12. A DC—DC converter in accordance with claim 9, wherein
said third setting voltage is set so as to be close to said second setting voltage as said direct current input voltage lowers.

13. A DC—DC converter in accordance with claim 1, wherein
said control section has a predetermined hysteresis characteristic in the operation of comparing said error voltage with said first setting voltage.

14. A DC—DC converter in accordance with claim 2, wherein
said oscillation circuit is configured so as to make small the ratio of the rising period per one cycle of said oscillation voltage when said error voltage becomes higher than said first setting voltage.

15. A DC—DC converter in accordance with claim 1, wherein
said control section has a predetermined hysteresis characteristic in the operation of comparing said error voltage with said second setting voltage.

16. A DC—DC converter in accordance with claim 2, wherein
said oscillation circuit is configured so as to make small the ratio of the rising period per one cycle of said oscillation voltage when said error voltage becomes lower than said second setting voltage.

* * * * *